United States Patent
Li et al.

(10) Patent No.: US 8,802,290 B2
(45) Date of Patent: Aug. 12, 2014

(54) CATHODE COMPOSITE MATERIAL, METHOD FOR MAKING THE SAME, AND LITHIUM ION BATTERY USING THE SAME

(71) Applicants: Tsinghua University, Beijing (CN); Hon Hai Precision Industry Co., Ltd., New Taipei (TW)

(72) Inventors: Ya-Dong Li, Beijing (CN); Jun Lu, Beijing (CN); Cai-Yun Nan, Beijing (CN); Li-Hong Li, Beijing (CN); Qing Peng, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/690,334

(22) Filed: Nov. 30, 2012

(65) Prior Publication Data

US 2014/0087256 A1  Mar. 27, 2014

(30) Foreign Application Priority Data

Sep. 27, 2012 (CN) .......................... 2012 1 0369003

(51) Int. Cl.
| | |
|---|---|
| *H01M 4/13* | (2010.01) |
| *H01M 4/485* | (2010.01) |
| *H01M 4/505* | (2010.01) |
| *H01M 4/525* | (2010.01) |
| *H01M 4/1391* | (2010.01) |
| *H01M 4/131* | (2010.01) |
| *H01M 10/0525* | (2010.01) |

(52) U.S. Cl.
CPC .............. *H01M 4/485* (2013.01); *H01M 4/505* (2013.01); *H01M 4/525* (2013.01); *H01M 4/1391* (2013.01); *H01M 4/131* (2013.01); *H01M 10/0525* (2013.01); *Y02E 60/122* (2013.01)
USPC ........ 429/218.1; 429/209; 429/223; 429/224; 429/225; 429/231.4; 429/231.6; 429/231.8; 429/231.95

(58) Field of Classification Search
CPC .... Y02E 60/122; H01M 4/505; H01M 4/485; H01M 4/525; H01M 4/1391; H01M 4/131; H01M 10/0525
USPC ........... 429/209, 218.1, 223, 224, 225, 231.4, 429/231.6, 231.8, 231.95
See application file for complete search history.

(56) References Cited

U.S. PATENT DOCUMENTS

| | | | |
|---|---|---|---|
| 2002/0070374 A1* | 6/2002 | Barker et al. ................ | 252/500 |
| 2003/0035999 A1* | 2/2003 | Gao et al. .................... | 429/231.1 |
| 2009/0104530 A1* | 4/2009 | Shizuka et al. .............. | 429/223 |
| 2011/0086257 A1* | 4/2011 | Pitteloud et al. ............ | 429/144 |
| 2011/0086274 A1* | 4/2011 | Chang et al. ................ | 429/223 |
| 2011/0111298 A1* | 5/2011 | Lopez et al. ................ | 429/221 |

* cited by examiner

*Primary Examiner* — Patrick Ryan
*Assistant Examiner* — Ben Lewis
(74) *Attorney, Agent, or Firm* — Novak Druce Connolly Bove + Quigg LLP

(57) ABSTRACT

A cathode composite material includes a cathode active material and a coating layer coated on a surface of the cathode active material. A material of the coating layer is a lithium metal oxide having a crystal structure belonging to C2/c space group of the monoclinic crystal system. The present disclosure also relates to a lithium ion battery including the cathode composite material.

17 Claims, 20 Drawing Sheets

US 8,802,290 B2

CATHODE COMPOSITE MATERIAL, METHOD FOR MAKING THE SAME, AND LITHIUM ION BATTERY USING THE SAME

CROSS-REFERENCE TO RELATED APPLICATIONS

This application claims all benefits accruing under 35 U.S.C. §119 from China Patent Application No. 201210369003.3, filed on Sep. 27, 2012 in the China Intellectual Property Office, the content of which is hereby incorporated by reference. This application is related to commonly-assigned application Ser. No. 13/690,349 entitled, "CATHODE COMPOSITE MATERIAL, METHOD FOR MAKING THE SAME, AND LITHIUM ION BATTERY USING THE SAME", filed Nov. 30, 2012; Ser. No. 13/690,355 "CATHODE COMPOSITE MATERIAL AND LITHIUM ION BATTERY USING THE SAME", filed Nov. 30, 2012, Ser. No. 13/690,410 "CATHODE COMPOSITE MATERIAL AND LITHIUM ION BATTERY USING THE SAME", filed Nov. 30, 2012, Ser. No. 13/691,518 "CATHODE COMPOSITE MATERIAL AND LITHIUM ION BATTERY USING THE SAME", filed Nov. 30, 2012, "CATHODE COMPOSITE MATERIAL AND LITHIUM ION BATTERY USING THE SAME", filed Nov. 30, 2012 Ser. No. 13/691,528 "CATHODE COMPOSITE MATERIAL AND LITHIUM ION BATTERY USING THE SAME", filed Nov. 30, 2012.

BACKGROUND

1. Technical Field

The present disclosure relates to cathode active materials used in rechargeable lithium ion batteries, and particularly to a cathode composite material, a method for making the same, and a rechargeable lithium ion battery using the same.

2. Description of Related Art

Lithium ion batteries can experience capacity loss during charging and discharging cycles and a poor cycling life due to the capacity loss. One reason for the capacity loss during the cycling is an un-reversible change of an intrinsic structure of a cathode active material that occurs during cycling. Another reason for the capacity loss during the cycling is a cathode active material loss caused by a reaction between the cathode active material and the organic solvent that occurs when the cathode active material is in a lithium ion deintercalation state and thus has a high oxidability. Therefore, how to improve the stability of the cathode active material during cycling of the battery and decrease unwanted reactions in the battery is crucial in improving the cycling life of the lithium ion battery.

A common method to improve the conductive properties of cathode active materials of lithium batteries is to treat the surface of the materials. For example, compared to untreated $LiFePO_4$, the carbon coated $LiFePO_4$ particles has improved conductivity. However, the stability improving problem during the cycling of the lithium ion battery has not been properly solved.

What is needed, therefore, is to provide a cathode composite material having a relatively good cycling stability, a method for making the same, and a lithium ion battery using the same.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
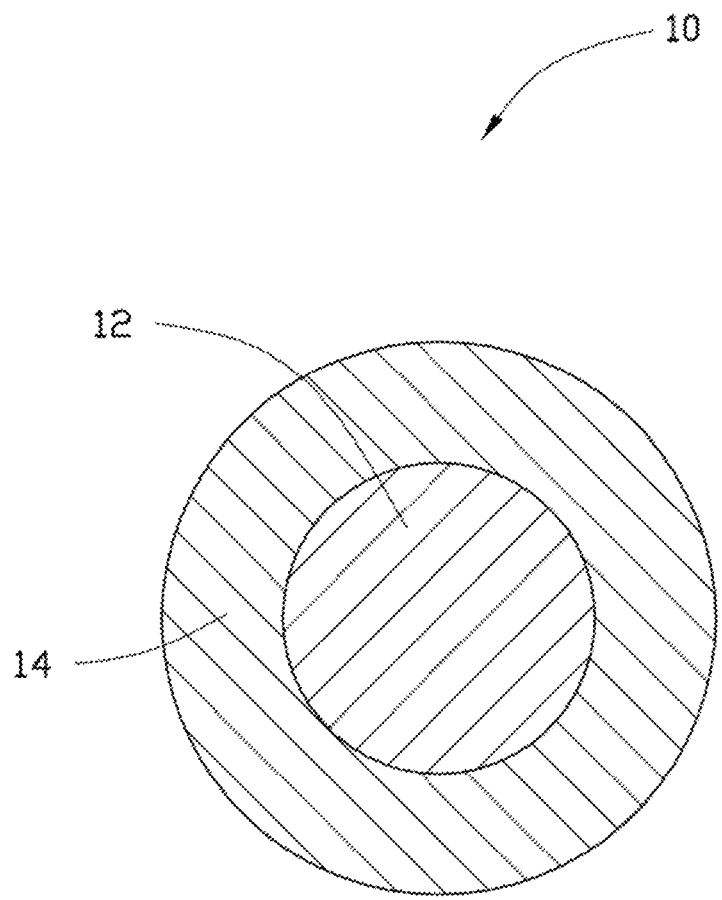
FIG. 1 is a view of an embodiment of a cathode composite material of a lithium ion battery.

Referring to FIG. 1, one embodiment of a cathode composite material 10 of a lithium ion battery includes a cathode active material particle 12 and a coating layer 14 coated on a surface of the cathode active material particle 12.

Cathode Active Material

The cathode active material particle 12 can be any commonly used cathode active material of lithium ion battery. For example, the material of the cathode active material particle 12 can be a lithium transition metal oxide. The transition metal of the lithium transition metal oxide can be at least one of cobalt (Co), nickel (Ni), and manganese (Mn). The lithium transition metal oxide can have a crystal structure of spinel type, layered type, or olivine type.

For example, the lithium transition metal oxide can be at least one of spinel type lithium manganese oxides, olivine type lithium iron phosphates, layered type lithium manganese oxides, layered type lithium nickel oxides, layered type lithium cobalt oxides, spinel type lithium nickel manganese oxides, spinel type lithium nickel cobalt oxides, spinel type lithium cobalt manganese oxides, layered type lithium nickel cobalt manganese oxides, and any combination thereof. The lithium transition metal oxide can be doped or undoped.

The layered type lithium nickel oxide can be represented by a chemical formula of $Li_xNi_{1-y}L_yO_2$ (1). The layered type lithium cobalt oxide can be represented by a chemical formula of $Li_xCo_{1-y}L_yO_2$ (2). The layered type lithium manganese oxide can be represented by a chemical formula of $Li_xMn_{1-y}L_yO_2$ (3). The spinel type lithium manganese oxide can be represented by a chemical formula of $Li_xMn_{2-z}L_zO_4$ (4). The spinel type lithium nickel manganese oxide can be represented by a chemical formula of $Li_xNi_{1-n}Mn_{j-m}L_nR_mO_4$ (5). The spinel type lithium nickel cobalt oxide can be represented by a chemical formula of $Li_xNi_{i-n}Co_{j-m}L_nR_mO_4$ (6). The spinel type lithium cobalt manganese oxide can be represented by a chemical formula of $Li_xCo_{i-n}Mn_{j-m}L_nR_mO_4$ (7). The layered type lithium nickel cobalt manganese oxide can be represented by a chemical formula of $Li_xNi_dCo_eMn_fL_gO_2$ (8). In the aforementioned chemical formulas (1) through (8), $0.1 \le x \le 1.1$, $0 \le y \le 1$, $i+j=2$, $0 \le m<0.2$, $0 \le n<0.2$, $0<i-n<2$, $0<j-m<2$, $0<d<1$, $0<e<1$, $0<f<1$, $0 \le g \le 0.2$, $d+e+f+g=1$, $0 \le z<2$. In one embodiment, $0 \le z<0.1$, $0.1<y<0.5$. In the aforementioned chemical formulas (1) through (8), L and R respectively represent at least one of the chemical elements of alkali metal elements, alkaline-earth metal elements, Group-13 elements, Group-14 elements, transition metal elements, and rare-earth elements. In one embodiment, L and R respectively represent at least one of the chemical elements of Co, Mn, Ni, chromium (Cr), vanadium (V), titanium (Ti), tin (Sn), copper (Cu), aluminum (Al), iron (Fe), boron (B), strontium (Sr), calcium (Ca), gallium (Ga), neodymium (Nd), and magnesium (Mg).

The shape of cathode active material particle 12 is not limited and can be sphere shape, rod shape, needle shape, sheet shape, tube shape, or irregular shape. A cathode electrode of a lithium ion battery can includes a plurality of cathode active material particles 12 in a powder form.

The size of a single cathode active material particle 12 can be chosen according to need and can be in a range from about 1 micron to about 500 microns.

Coating Layer

The coating layer 14 can be an in situ formed layer on the surface of the cathode active material particle 12 and can be a continuous material layer having a uniform thickness. The material of the coating layer 14 can be a lithium metal oxide having a crystal structure belonging to C2/c space group of the monoclinic crystal system. A general chemical formula of the lithium metal oxide can be $Li_2AO_3$, wherein A represents a metal element which has a +4 valence. In one embodiment, the A of the $Li_2AO_3$ can be selected from at least one of Ti, Sn, Mn, lead (Pb), tellurium (Te), ruthenium (Ru), hafnium (Hf), and zirconium (Zr). For example, the lithium metal oxide can be at least one of $Li_2TiO_3$, $Li_2MnO_3$, $Li_2SnO_3$, $Li_2PbO_3$, $Li_2TeO_3$, $Li_2RuO_3$, $Li_2HfO_3$, and $Li_2ZrO_3$.

The lithium metal oxide can be undoped, or doped with doping chemical elements. The transition metal atoms of the cathode active material particle 12 can diffuse into the coating layer 14 to form the doped lithium metal oxide. The lithium metal oxide can also be represented by a general formula (9) of $[Li_{1-2a}M_a\square_a]^\alpha[Li_{1/3-2b-c}M_bN_{3c}A_{2/3-2c}\square_b]^\beta O_2$, wherein M and N represent doping chemical elements, "$\square$" represents an atom vacancy, which occupies a Li site in the $[Li]^\alpha[Li_{1/3}A_{2/3}]^\beta O_2$, $0 \le 2a<1$, $0 \le 2b+c<1/3$, and $0 \le 2C \le 2/3$. In the general formula (9), atoms of $Li_{1-2a}M_a\square_a$ are located on inter-plane octahedral sites, atoms of $Li_{1/3-2b-c}M_bN_{3c}A_{2/3-2c}\square_b$ are located on in-plane octahedral sites. More specifically, the undoped $Li_2AO_3$ can also be represented by the chemical formula of $[Li]^\alpha[Li_{1/3}A_{2/3}]^\beta O_2$, which is a transform of the formula $Li_2AO_3$, wherein $[\ ]^\alpha$ represents that the atoms in the $[\ ]^\alpha$ are located on the inter-plane octahedral sites, which are occupied by Li, and $[\ ]^\beta$ represents that the atoms in the $[\ ]^\beta$ are located on the in-plane octahedral sites, which are occupied by Li and A in a molar ratio of 1/3:2/3. When the ions of the doping element M replace an amount of $Li^+$ located on the inter-plane octahedral sites and in-plane octahedral sites, an equal amount of atom vacancies ($\square$) are also generated. The atom vacancies ($\square$) are helpful for $Li^+$ moving in the coating layer 14. Further, the ions of the doping element N can replace an amount of $Li^+$ and $A^{4+}$ of the $Li_{1/3}A_{2/3}$ located on the in-plane octahedral sites.

More specifically, M and N respectively represent at least one of the chemical elements of alkali metal elements, alkaline-earth metal elements, Group-13 elements, Group-14 elements, transition metal elements, and rare-earth elements. In one embodiment, M and N respectively represent at least one of the chemical elements of Co, Mn, Ni, Cr, V, Ti, Sn, Cu, Al, Fe, B, Sr, Ca, Ga, Nd, and Mg.

At least one of M and N can come from the lithium transition metal oxide of the cathode active material particle 12. At least one of M and N can be the same with the transition metal element in the lithium transition metal oxide of the cathode active material particle 12. For example, when the lithium transition metal oxide of the cathode active material particle 12 has the transition metal elements of Ni and Co (e.g., the lithium transition metal oxide is $LiNi_{0.5}Co_{0.5}O_2$), and A is Ti, the general formula of the material of the coating layer can be $[Li_{1-2a}Ni_a\square_a]^\alpha[Li_{1/3-2b-c}Ni_bCo_{3c}Ti_{2/3-2c}\square_b]^\beta O_2$, wherein the $Li^+$ both on the inter-plane octahedral sites and in-plane octahedral sites can be replaced by $Ni^{2+}$, and meanwhile, an equal amount of Li site atom vacancies can be generated. Moreover, the $Co^{3+}$ can replace the $Li^+$ and $Ti^{4+}$ on the in-plane octahedral sites, to make the structure of the $Li_2TiO_3$ of monoclinic crystal system similar to the layered type $LiMO_2$. Therefore, the combination between the coating layer 14 and the cathode active material particle 12 having the $LiMO_2$ type structure can be improved.

A mass percentage of the coating layer 14 to the cathode composite material 10 can be in a range from about 0.05% to about 7%. In one embodiment, the mass percentage of the coating layer 14 is about 5%. A thickness of the coating layer 14 can be in a range from about 2 nanometers (nm) to about 20 nm.

The cathode electrode of the lithium ion battery can include a plurality of cathode active material particles 12. The coating layer 14 can be individually coated on the individual cathode active material particle 12. The cathode electrode of the lithium ion battery can include a plurality of core-shell structures. Each core-shell structure has one cathode active material particle 12 as the core and one coating layer 14 as the shell. In one embodiment, each of the plurality of cathode active material particles 12 in the cathode electrode has the coating layer 14 coated thereon. The coating layer 14 can completely coat an entire outer surface of the individual cathode active material particle 12. The coating layer 14 can have a uniform thickness, and thus the cathode composite material 10 can have a sphere shape, rod shape, needle shape, sheet shape, tube shape, or irregular shape corresponding to the shape of the cathode active material particle 12.

Method For Making the Cathode Active Material

One embodiment of a method for preparing the cathode composite material of the lithium ion battery includes steps of:

S1, forming a composite precursor including a cathode active material precursor and a coating layer precursor coated on a surface of the cathode active material precursor;

S2, reacting the composite precursor with a lithium source chemical compound, to lithiate both the cathode active material precursor and the coating layer precursor in the composite precursor.

The cathode active material precursor is capable of having a chemical reaction with the lithium source chemical compound to produce the cathode active material. The material of the cathode active material precursor can be an oxygen compound of the transition metal. The transition metal can be at least one of Co, Ni, and Mn. The oxygen compound can be at least one of hydroxides, oxysalts, and oxides. The oxysalt is a salt of an oxyacid. The oxysalt can be at least one of oxalates, carbonates, acetates, and oxyhydroxides (i.e., oxide-hydroxides). For example, the oxysalt of the transition metal can be at least one of cobalt hydroxide ($Co(OH)_2$), nickel hydroxide ($Ni(OH)_2$), manganese hydroxide ($Mn(OH)_2$), cobalt oxalate ($CoC_2O_4 \cdot 2H_2O$), nickel oxalate ($NiC_2O_4 \cdot 2H_2O$), manganese oxalate ($MnC_2O_4 \cdot 2H_2O$), cobalt carbonate ($CoCO_3$), nickel carbonate ($NiCO_3$), manganese carbonate ($MnCO_3$), cobalt acetate ($Co(CH_3COO)_2 \cdot 4H_2O$), nickel acetate ($Ni(CH_3COO)_2 \cdot 4H_2O$), manganese acetate ($Mn(CH_3COO)_2 \cdot 4H_2O$), cobalt oxide-hydroxide (CoOOH), nickel oxide-hydroxide (NiOOH), and manganese oxide-hydroxide (MnOOH). The oxygen compound of the transition metal can be with or without the crystallization water.

The material of the coating layer precursor can be hydroxides or oxides of the metal element which has the +4 valence. For example, the material of the coating layer precursor can be at least one of titanium dioxide ($TiO_2$), stannic dioxide ($SnO_2$), manganese dioxide ($MnO_2$), lead dioxide ($PbO_2$), tellurium dioxide ($TeO_2$), ruthenium dioxide ($RuO_2$), hafnium dioxide ($HfO_2$), and zirconium dioxide ($ZrO_2$).

The material of the lithium source chemical compound can be at least one of lithium hydroxide, lithium chloride, lithium sulfate, lithium nitrate, lithium acetate, lithium dihydrogen orthophosphate.

Figure 2:
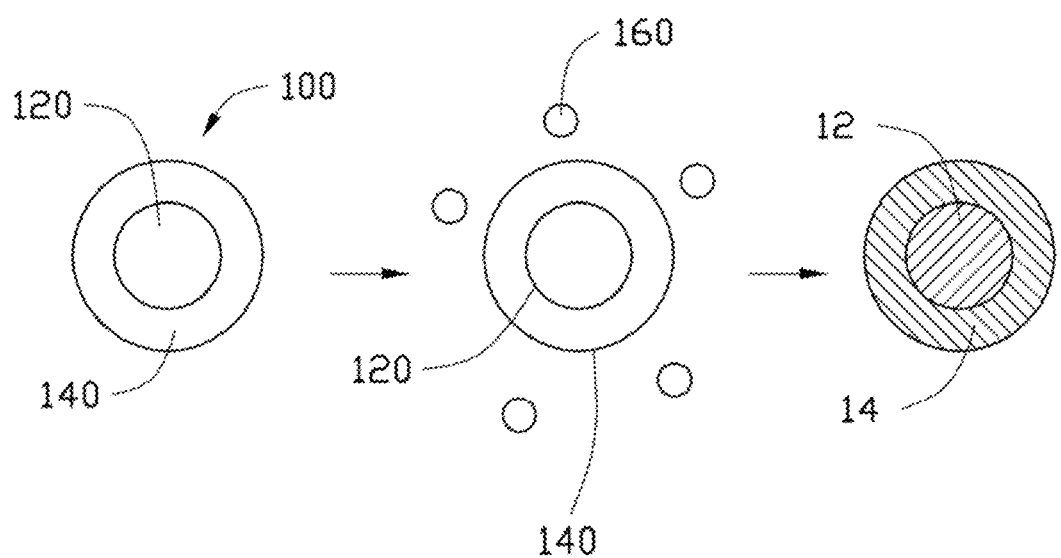
FIG. 2 is a view of an embodiment of a method for making the cathode composite material of the lithium ion battery.

Referring to FIG. 2, the above described method can be used to form the cathode composite material 10. The composite precursor 100 can include the coating layer precursor 140 and the cathode active material precursor 120. The coating layer precursor 140 is coated on the cathode active material precursor 120. The coating layer precursor 140 is capable of having a chemical reaction with the lithium source chemical compound to produce the coating layer 14. That is to say, the coating layer precursor 140 is a chemical compound which can have a chemical reaction with the lithium source chemical compound to produce the lithium metal oxide having a crystal structure belonging to the C2/c space group of the monoclinic crystal system. The cathode active material precursor 120 is capable of having a chemical reaction with the lithium source chemical compound to produce the cathode active material particle 12. The coating layer precursor 140 is a continuous layer shaped structure, which is in-situ formed on the outer surface of the cathode active material precursor 120. The lithium source chemical compound 160 can simultaneously react with the cathode active material precursor 120 and the coating layer precursor 140, to produce the cathode active material particle 12 and the coating layer 14 coated on the cathode active material 12. The cathode active material precursor 120 can have a particle shape. In one embodiment, a plurality of cathode active material precursors 120 are provided, and the coating layer precursor 140 is individually coated on the individual cathode active material precursor 120.

In one embodiment, the step S1 can further include steps of:

S11, dispersing the plurality of cathode active material precursors in a liquid solvent to form a solid-liquid mixture, and the plurality of cathode active material precursors are insoluble to the liquid solvent;

S12, adding a coating substance in the solid-liquid mixture;

S13, heating the solid-liquid mixture, having the coating substance added therein, to form the coating substance into the coating layer precursor on the outer surface of the cathode active material precursor, thereby forming the composite precursor.

In one embodiment, when the oxygen compound of the transition metal is at least one of hydroxides and oxysalts, or when the oxygen compound of the transition metal carries the crystallization water, the liquid solvent can only be an organic solvent (i.e., without water). The hydroxides, oxysalts, or the crystallization water can generate water in the solid-liquid mixture due to the heating step. The water reacts with the coating substance. The organic solvent can be a commonly used solvent such as methanol, ethanol, propanol, isopropanol, ethylene glycol, acetone, dichloroethane, and chloroform.

The coating substance can be a liquid state substance, a liquid solution, or a substance that is soluble to the liquid solvent. The coating substance can include at least one of metal halides and metal esters. In one embodiment, the metal element in the metal halides and metal esters has the +4 valence. More specifically, the coating substance can be at least one of diethyl titanate, tetrabutyl titanate, zirconium n-butoxide, tetrabutyl orthostannate, titanium tetrachloride ($TiCl_4$), zirconium tetrachloride ($ZrCl_4$), stannic tetrachloride ($SnCl_4$), lead tetrachloride ($PbCl_4$), tellurium tetrachloride ($TeCl_4$), ruthenium tetrachloride ($RuCl_4$), hafnium tetrachloride ($HfCl_4$), manganese tetrachloride ($MnCl_4$).

In the step S11, the plurality of cathode active material precursor can be uniformly dissolved in the liquid solvent through an ultrasonic vibration or a mechanical stirring method.

In the step S12, a molar ratio of the coating substance to the cathode active material precursor can be in a range from about 0.1:100 to about 20:100. The coating substance can be uniformly mixed with the solid-liquid mixture through an ultrasonic vibration or a mechanical stirring method.

In the step S13, the liquid-solid mixture having the coating substance added therein can be directly heated in an open environment in air or heated by using a hydrothermal synthesis method in an autoclave, which is sealed and has a pressure larger than 1 atm therein during the heating. The heating temperature can be decided according to the pressure and the material of the coating substance. In one embodiment, the heating temperature can be in a range from about 80° C. to about 200° C. The heating time can be decided according to the heating temperature and the amount of the coating substance. In one embodiment, the heating time can be in a range from about 10 minutes to about 20 hours. In the heating step of the step S13, the coating substance can have a hydrolysis reaction to produce the coating layer precursor on the outer surface of the cathode active material precursor.

Figure 3:
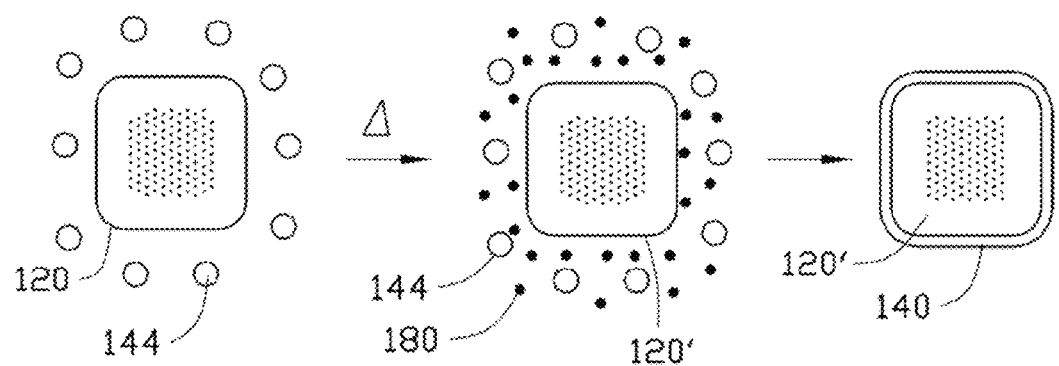
FIG. 3 is a view of an embodiment of a method for making a composite precursor in the method for making the cathode composite material of the lithium ion battery.

Referring to FIG. 3, when the cathode active material precursor 120 carries the crystallization water 180, during the heating step of the step S13, the crystallization water can escape from the cathode active material precursor 120 to form a liquid state water. The liquid state water can have a reaction with the coating substance 144 to form the coating layer precursor 140 coated on the surface of the crystallization water removed cathode active material precursor 120'.

By using the liquid solvent without the water, and providing the water only by the crystallization water of the cathode active material precursor, the reaction between the water and the coating substance is easier to be controlled and the morphology of the coating layer precursor can be formed well. Accordingly, the uniformity of the coating layer precursor can be improved.

In another embodiment, the step S1 can include steps of:

S11', dispersing the plurality of cathode active material precursor in a liquid solvent to form a solid-liquid mixture, and the plurality of cathode active material precursor is insoluble to the liquid solvent.

S12', adding a coating substance in the solid-liquid mixture;

S13', reacting the coating substance with water to have a hydrolysis reaction, to produce the coating layer precursor on the outer surface of the cathode active material precursor, thereby forming the composite precursor.

The steps S11' to S13' is similar to the steps S11 to S13, except that when the cathode active material precursor 120 itself does not carries the crystallization water, an additional step of reacting the coating substance with an added water can be used to hydrolyses the coating substance. More specifically, in one embodiment, the liquid solvent can be a mixture of the organic solvent and a small amount of water. A volume ratio between the water and the organic solvent can be equal to or smaller than 1:10 (in some embodiments is smaller than 1:50). In another embodiment, when the liquid solvent only includes the organic solvent, the step S13' can further include a step of adding water into the solid-liquid mixture. The amount of the added water can be decided by the amount of the coating substance. Overall, the solid-liquid mixture can include a small amount of water. The amount of the water can be decided by the amount of the coating substance.

In the step S2, the composite precursor is reacted with the lithium source chemical compound, the cathode active material precursor and the coating layer precursor can both be lithiated. A high-temperature solid-state reaction can be used to react the composite precursor with the lithium source chemical compound. More specifically, the step S2 can include steps of uniformly mixing the composite precursor with the lithium source chemical compound to form a solid-solid mixture and heating the solid-solid mixture, under a solid-state reaction temperature. The composite precursor and the lithium source chemical compound can be mixed through a mechanical stirring method or a ball milling method. The solid-state reaction temperature can be decided according to the material of the composite precursor. In one embodiment, the solid-state reaction temperature can be in a range from about 400° C. to about 900° C., and the heating time can be in a range from about 2 hours to about 12 hours.

In one embodiment, before heating the solid-solid mixture under the solid-state reaction temperature, an additional step of pre-heating the solid-solid mixture under a relatively low temperature can be processed for fully decomposing the composite precursor. The relatively low temperature can be in a range from about 350° C. to about 400° C., and the pre-heating time can be in a range from about 0.5 hours to about 1 hour. After the pre-heating step, the solid-solid mixture can be directly heated to reach the solid-state reaction temperature without a cooling step.

An amount of the lithium source chemical compound can be decided by the amount of the composite precursor. More specifically, the amount of the lithium source chemical compound can be calculated from the lithium amount required for lithiating the cathode active material precursor and the coating layer precursor. Moreover, for the reason that the lithium is apt to be volatilized in a high temperature, the lithium source chemical compound can be excess for the composite precursor. In one embodiment, the stoichiometric ratio between the lithium source chemical compound and the composite precursor can be in a range from about 1:1 to about 1.2:1. During the lithiation of the cathode active material precursor to produce the cathode active material, the lithium source chemical compound also reacts with the coating layer precursor, and directly forms the coating layer on the surface of the formed cathode active material. The coating layer precursor and the cathode active material precursor are simultaneously heated at the solid state reaction temperature, and both form the lithiated substances; thus, there is a strong chemical bonding force between the formed cathode active material and the coating layer, to make the coating layer continuously, tightly and uniformly coated on the surface of the cathode active material.

It is to be understood that the coating substance can include more than one metal element which having the +4 valence. Thus, the finally formed coating layer 14 can include more than one lithium metal oxides mixed with each other. Moreover, the cathode active material precursor can also include more than one oxygen compound of the transition metals. Thus, the finally formed cathode active material particle 12 can include more than one transition metal elements. Moreover, the cathode active material precursor can also include at least one of the above mentioned doping elements L and R. Thus, the finally formed cathode active material particle 12 can be a doped lithium transition metal oxide.

The cathode composite material of the present disclosure includes the coating layer coated on the cathode active material to avoid a direct contact between the cathode active material and the electrolyte solution. The material of the coating layer can be a lithium metal oxide having a crystal structure belonging to C2/c space group of the monoclinic crystal system. Thus, the lithium metal oxide has a one dimensional lithium ion transferring path along a crystal axis c of the crystal structure of the lithium metal oxide. Therefore, the coating layer can prevent an electron migration between the electrolyte and the cathode active material and allow the lithium ions to pass therethrough. Thus, the side reaction during the charge and discharge of the lithium ion battery between the electrolyte and the cathode active material can be suppressed. Therefore, the cathode composite material has improved chemical and thermal stabilities, even at a relatively high or low charge/discharge voltage, or a high rate.

In an embodiment of the method, a composite precursor having a core-shell structure is previously prepared, and then the core and the shell of the core-shell structure are simultaneously lithiated, to form the cathode composite material and the cathode active material at the same time. The in situ formed coating layer is an integrated and continuous material layer having uniform thickness, not just a plurality of particles loosely stacked on the cathode active material. The coating layer and the cathode active material have a tight combination, which effectively decreases the dislocation and increase the lithium ion mobility in the coating layer. Therefore, the lithium ion battery using the cathode composite material has a relatively good cycle performance.

Lithium Ion Battery

Figure 20:
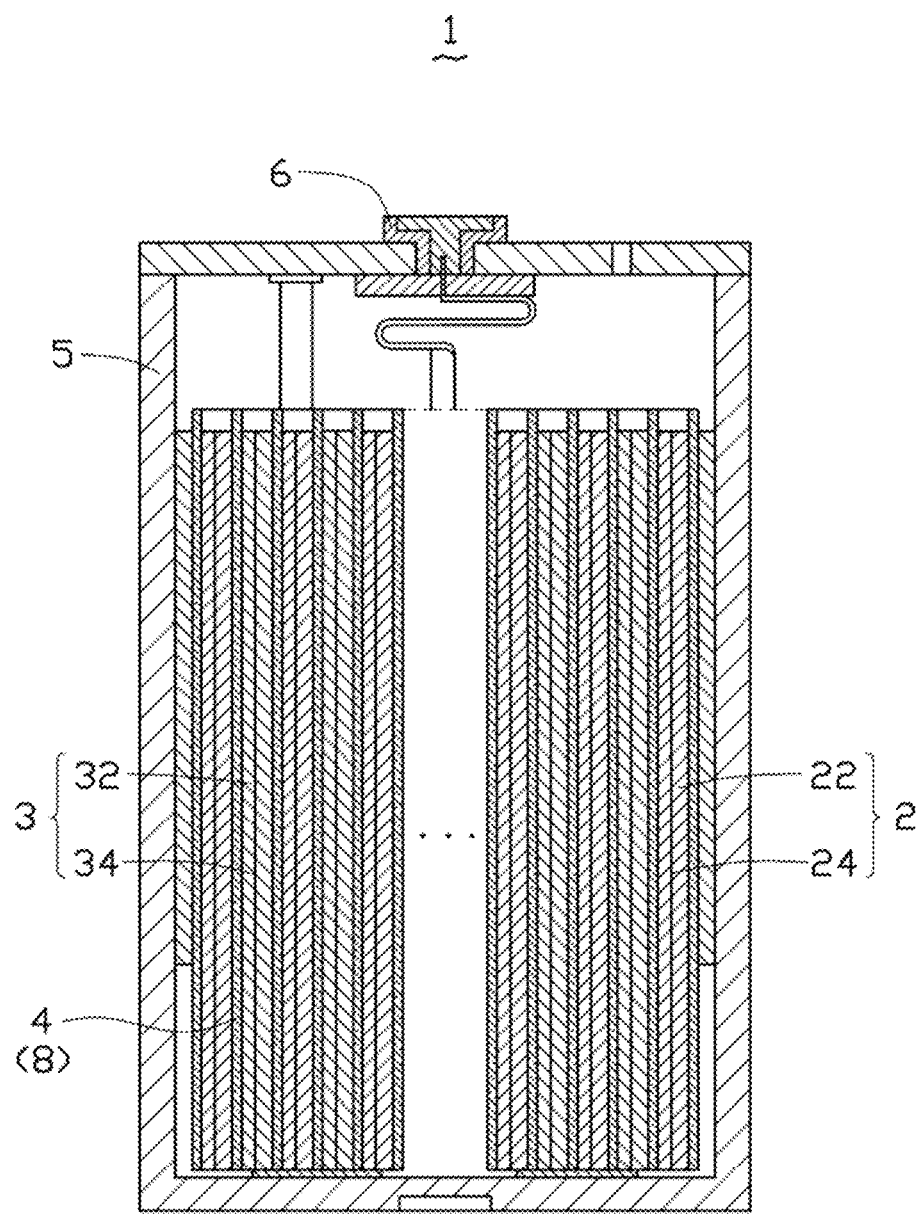
FIG. 20 is a cross-sectional view of an embodiment of a lithium ion battery.

Referring to FIG. 20, one embodiment of a lithium ion battery 1 includes a cathode electrode 2, an anode electrode 3 spaced from the cathode electrode 2, and a non-aqueous electrolyte 8 disposed between the cathode electrode 2 and the anode electrode 3.

The cathode electrode 2 can include a cathode current collector 24 and a cathode material layer 22. The cathode current collector 24 is used for supporting the cathode material layer 22 and conducting current. A shape of the cathode current collector 24 can be a continuous sheet or a network. A material of the cathode current collector 24 can be metal or alloy, such as aluminum, titanium, or stainless steel. The cathode material layer 22 is disposed on at least one surface of the cathode current collector 24. The cathode material layer 22 includes the above described cathode composite material 10 and can further include a conductive agent and a binder. The cathode composite material 10, conductive agent, and the binder can be uniformly mixed with each other.

The anode electrode 3 can include an anode current collector 34 and an anode material layer 32. The anode current collector 34 is used for supporting the anode material layer 32 and conducting current. A shape of the anode current collector 34 can be a continuous sheet or a network. A material of the anode current collector 34 can be metal or alloy, such as copper, nickel, or stainless steel. The anode material layer 32 is disposed on at least one surface of the anode current collector 34. The anode material layer 32 includes an anode active material and can further include a conductive agent and a binder. The anode active material, conductive agent, and the binder can be uniformly mixed with each other. The anode active material particle can be lithium titanate (e.g., $Li_4Ti_5O_{12}$), graphite, acetylene black, organic cracking carbon, mesocarbon microbeads, or any combination thereof.

The anode material layer 32 faces the cathode material layer 22. Both the anode material layer 32 and the cathode material layer 22 are in contact with the electrolyte. The electrolyte 8 can be a solid electrolyte film or a liquid non-aqueous electrolyte solution. The solid electrolyte film can be sandwiched between the anode electrode 3 and the cathode electrode 2. If the lithium ion battery 1 uses the liquid non-aqueous electrolyte solution, the cathode electrode 2 and the anode electrode 3 are both disposed in the liquid non-aqueous electrolyte solution. The lithium ion battery 1 can further include a separator 4 disposed between the anode material layer 32 and the cathode material layer 22, to electrically insulate them from each other. The separator 4 is capable of having the lithium ions pass therethrough. The liquid non-aqueous electrolyte solution includes an organic solvent and a lithium salt dissolved in the organic solvent. The organic solvent can be selected from cyclic carbonates, linear carbonates, cyclic ethers, linear ethers, nitriles, and amides, and can be at least one of ethylene carbonate, propylene carbonate, ethylmethyl carbonate, diethyl carbonate, dimethyl carbonate, butylenes carbonate, vinylene carbonate, methylethyl carbonate, methyl acetate, ethyl acetate, propyl acetate, methyl propionate, ethyl propionate, γ-butyrolactone, 1,2-dimetroxyethane, 1,2-diethoxyethane, tetrahydrofuran, 1,2-dioxane, 2-methyltetrahydrofuran, acetonitrile, and dimethylformamide. The lithium salt may be at least one of $LiPF_6$, $LiBOB$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiCl$, and $LiI$. The separator 4 can be a porous membrane. The material of the separator can be polyolefins, such as polypropylene or polyethylene, or inorganic material such as porous ceramics.

The conductive agents and the binders in the anode material layer 32 and the cathode material layer 22 can be the same. The conductive agent can be a carbonaceous material such as carbon black, acetylene black, conductive polymers, carbon fibers, carbon nanotubes, graphene, and graphite. The binder can be at least one of polyvinylidene fluoride, polytetrafluoroethylene, and styrene-butadiene rubber.

The materials of the anode current collector 34, the cathode current collector 24, the conductive agent, the binder, the electrolyte, and the separator 4 are not limited by the above listed materials, and can be selected from other known materials.

The lithium ion battery 1 can further include an exterior encapsulating structure, such as a hard battery case 5 sealed by a sealing member 6, or a soft encapsulating bag, having the cathode electrode 2, the anode electrode 3, the separator 4, the electrolyte 8 located therein. The lithium ion battery 1 can further include a connecting component achieving an electrical connection between the current collector of the lithium ion battery 1 and the external circuit.

EXAMPLES

Example 1

Figure 4:
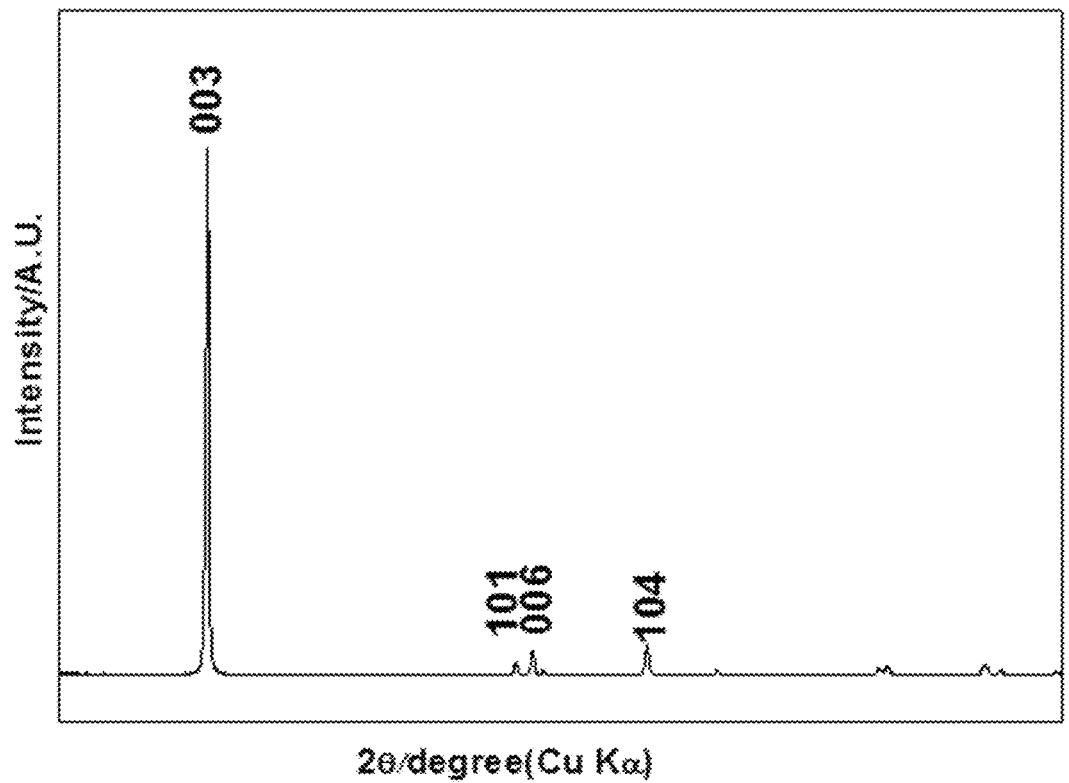
FIG. 4 shows an X-ray diffraction (XRD) pattern of Co doped $Li_2TiO_3$ Coated $LiCoO_2$ of Example 1.
Figure 5:
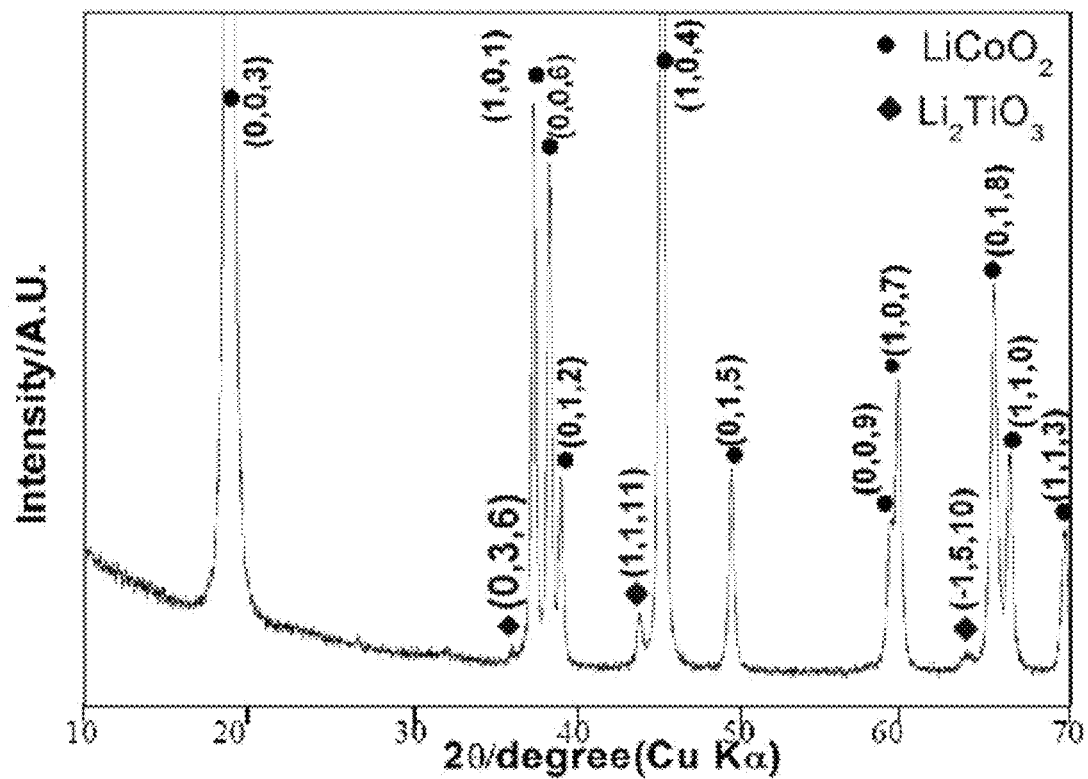
FIG. 5 is an enlarged view of a portion of FIG. 4.

In Example 1, 0.25 g $Co(OH)_2$ is ultrasonically dispersed in 10 mL of ethanol to achieve the solid-liquid mixture. Then, the tetrabutyl titanate is added into the solid-liquid mixture. A molar ratio between the tetrabutyl titanate and the $Co(OH)_2$ is about 1:10. After adding the tetrabutyl titanate, the solid-liquid mixture is continuously ultrasonically vibrated to uniformly mix the tetrabutyl titanate and the $Co(OH)_2$ in the ethanol. After that, the solid-liquid mixture is transferred into a dry and clean hydrothermal autoclave and reacted at about 150° C. for about 3 hours. After the hydrothermal synthesis, the amorphous $TiO_2$ layer can be formed on the surface of the $Co(OH)_2$, to form the composite precursor. The composite precursor and the $LiOH.H_2O$ are mixed in the stoichiometric ratio and are dried to remove the residual ethanol. Then the mixture of the composite precursor and the $LiOH.H_2O$ are heated to about 800° C. at a temperature increasing rate of about 3° C./min, and is heated at the 800° C. for about 5 hours. The cathode composite material is naturally cooled down to room temperature. The cathode composite material is the core-shell structure having $LiCoO_2$ as the core and Co doped $Li_2TiO_3$ as the shell. An XRD analysis is conducted on the cathode composite material. Referring to FIG. 4, the XRD pattern of the cathode composite material shows that a pure phase $LiCoO_2$ exits in the cathode composite material. Referring to FIG. 5, by enlarging the XRD pattern of FIG. 4, the $Li_2TiO_3$ peaks can be observed, which shows that the $Li_2TiO_3$ is formed. Further, the peak of the $Li_2TiO_3$ near the 23 degrees of the 2 theta value disappears, which means that $Co^{3+}$ is doped in the $Li_2TiO_3$.

A lithium ion battery is assembled using the cathode composite material of the Example 1 in the cathode electrode.

Comparative Example 1

A lithium ion battery is assembled according to the same conditions as in Example 1, except that the cathode composite material formed in Example 1 is replaced by the bare $LiCoO_2$ without any coating layer coated thereon.

Electrochemical Experiment of Example 1 and Comparative Example 1

Figure 6:
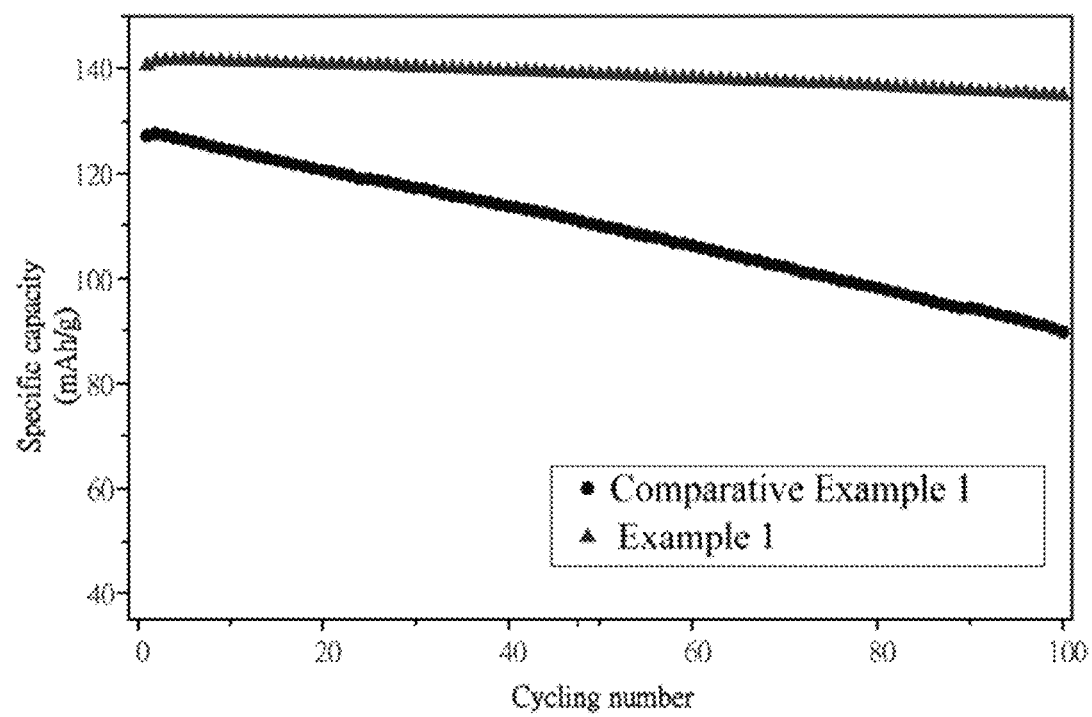
FIG. 6 is a graph comparing cycle performance testing results of lithium ion batteries of Example 1 and Comparative Example 1.

Referring to FIG. 6, the two lithium ion batteries of the Example 1 and Comparative Example 1 are galvanostatically cycled using the 1C current rate. The lithium ion battery of the Example 1 has a higher discharge specific capacity at the first cycle (about 140 mAh/g), and a better capacity retention. After 100 Cycles of the charge and discharge, the discharge specific capacity of the lithium ion battery of the Example 1 hardly decreased. On the contrary, the lithium ion battery of the Comparative Example 1 only has the discharge specific capacity of about 128 mAh/g at the first cycle. After 100 Cycles of the charge and discharge, the discharge specific capacity of the lithium ion battery of the Comparative Example 1 is below 90 mAh/g.

Figure 7:
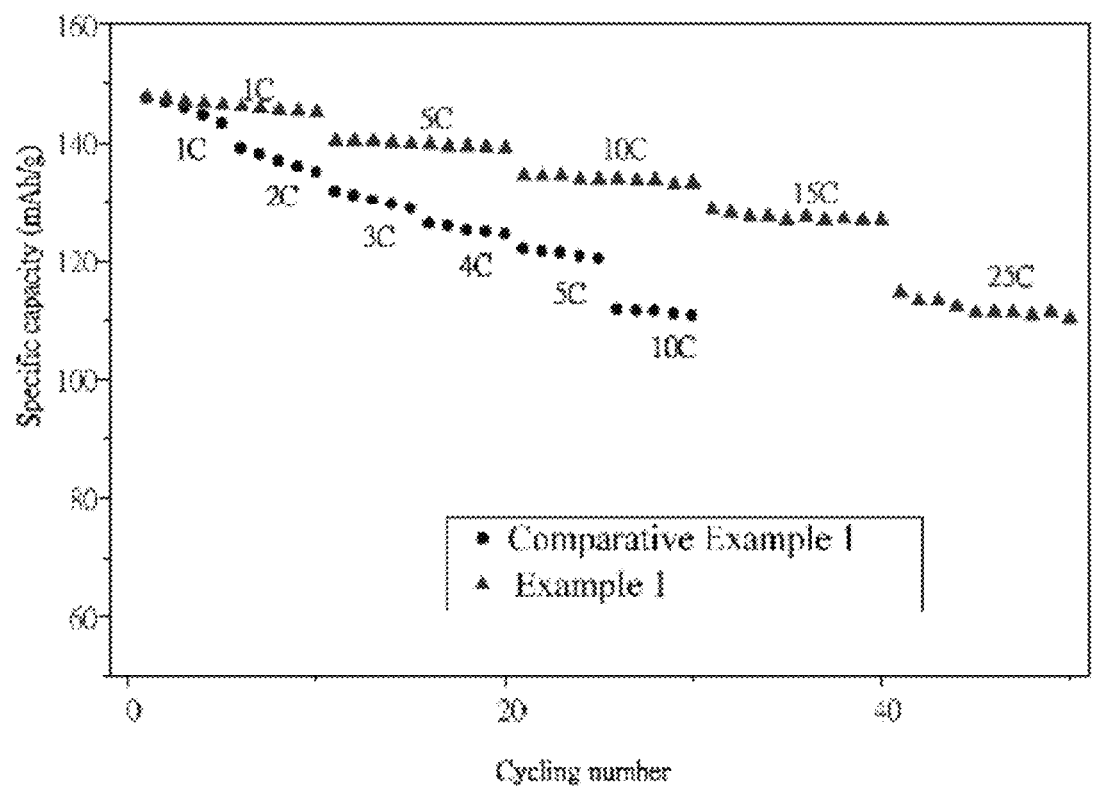
FIG. 7 is a graph comparing cycle performance testing results of lithium ion batteries of Example 1 and Comparative Example 1 using different current rates.

Referring to FIG. 7, the lithium ion battery of the Comparative Example 1 are galvanostatic cycled using the current rates of 1C, 2C, 3C, 4C, 5C, and 10C. As the current rate increases, the discharge specific capacity of the lithium ion battery of the Comparative Example 1 dramatically decreases. When the current rate gets to 10 C, the discharge capacity of the lithium ion battery of the Comparative Example 1 is only about 110 mAh/g. On the contrary, the lithium ion battery in the Example 1 having the $LiCoO_2$ Coated by the Co doped $Li_2TiO_3$ Coating layer has a better rating performance. The lithium ion battery of the Example 1 is galvanostatic cycled using the current rates of 1C, 5C, 10C, 15C, 20C, and 25C. As the current rate increases, the discharge specific capacity of the lithium ion battery of the Example 1 does not decrease much. When the current rate gets to 10 C, the discharge specific capacity of the lithium ion battery of the Example 1 is still about 137 mAh/g. The discharge specific capacity of the lithium ion battery of the Example 1 at 25C is also larger than the discharge specific capacity of the lithium ion battery of the Comparative Example 1 at 10C.

Example 2

In Example 2, the cathode composite material is prepared using the same method as in Example 1, except that the $Co(OH)_2$ is replaced by $CoC_2O_4 \cdot xH_2O$.

Example 3

Figure 8:
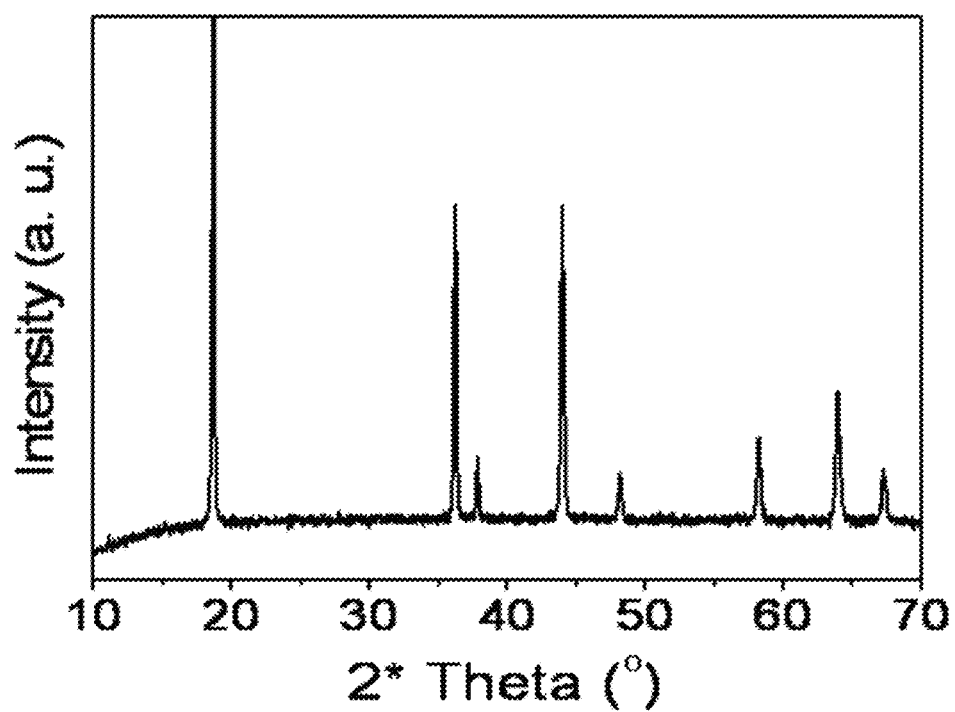
FIG. 8 shows an XRD pattern of Mn doped $Li_2TiO_3$ Coated $LiMn_2O_4$ of Example 3.

In Example 3, 0.25 g MnOOH is ultrasonically dispersed in 10 mL of ethanol to achieve the solid-liquid mixture. Then, the tetrabutyl titanate is added into the solid-liquid mixture. A molar percentage of the tetrabutyl titanate to the MnOOH is about 5%. After adding the tetrabutyl titanate, the solid-liquid mixture is continuously ultrasonically vibrated to uniformly mix the tetrabutyl titanate and the MnOOH in the ethanol. After that, the solid-liquid mixture is transferred into a dry and clean hydrothermal autoclave and reacted at about 150° C. for about 3 hours. After the hydrothermal synthesis, the amorphous $TiO_2$ layer can be formed on the surface of the MnOOH, to form the composite precursor. The composite precursor and the $LiOH \cdot H_2O$ are mixed in the stoichiometric ratio and are dried to remove the residual ethanol. Then the mixture of the composite precursor and the $LiOH \cdot H_2O$ are heated to about 800° C. at a temperature increasing rate of about 3° C./min, and is heated at the 800° C. for about 5 hours. The cathode composite material is naturally cooled down to room temperature. The cathode composite material is the core-shell structure having $LiMn_2O_4$ as the core and Mn doped $Li_2TiO_3$ as the shell. An XRD analysis is conducted on the cathode composite material. Referring to FIG. 8, the XRD pattern of the cathode composite material shows that a pure phase $LiMn_2O_4$ exits in the cathode composite material. The peak of the $Li_2TiO_3$ disappears, which means that Mn ions are doped in the $Li_2TiO_3$. An X-ray photoelectron spectroscopy (XPS) analysis is conducted on the cathode composite material to measure the content of the element on the surface of the cathode composite material. The XPS analysis result shows that the molar percentage of Ti element is about 15.29%, which is much larger than 5%. That is, Ti element mainly exists on the surface of the cathode composite material. According to a further calculation, Ti element only exist on an outer surface layer having a thickness of about 10 nm of the cathode composite material.

A lithium ion battery is assembled using the cathode composite material of the Example 3 in the cathode electrode.

Comparative Example 3

A lithium ion battery is assembled according to the same conditions as in Example 3, except that the cathode composite material formed in Example 3 is replaced by the bare $LiMn_2O_4$ without any coating layer coated thereon.

Electrochemical Experiment of Example 3 and Comparative Example 3

Figure 9:
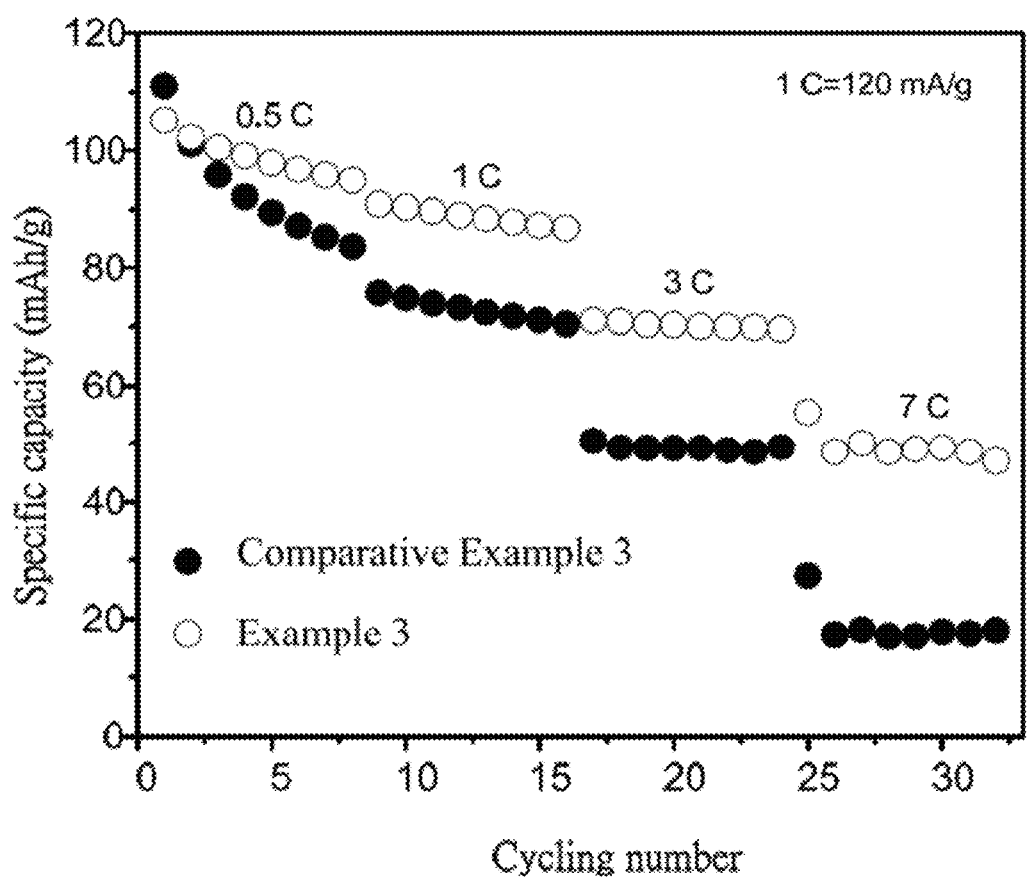
FIG. 9 is a graph comparing cycle performance testing results in different current rates of lithium ion batteries of Example 3 and Comparative Example 3.

Referring to FIG. 9, the two lithium ion batteries of the Example 3 and Comparative Example 3 are galvanostatic cycled using the current rates of 0.5 C, 1 C, 3 C, and 7 C. As the current rate increases, the discharge specific capacity of the lithium ion battery of the Comparative Example 3 dramatically decreases. When the current rate gets to 7 C, the discharge capacity of the lithium ion battery of the Comparative Example 3 is only about 20 mAh/g. On the contrary, the lithium ion battery in the Example 3 having the $LiMn_2O_4$ Coated by the Mn doped $Li_2TiO_3$ Coating layer has a much better rating performance. As the current rate increases, the discharge specific capacity of the lithium ion battery of the Example 3 does not decrease much. When the current rate gets to 7 C, the discharge specific capacity of the lithium ion battery of the Example 3 is still about 40 mAh/g.

Figure 10:
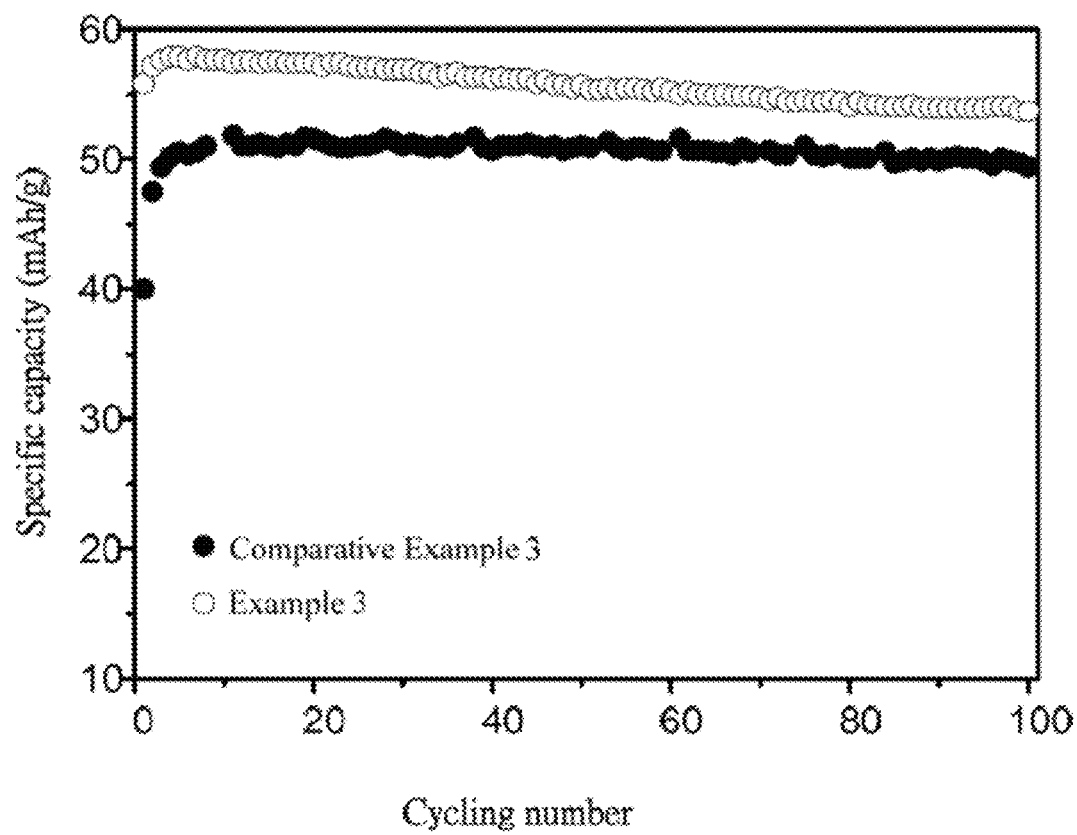
FIG. 10 is a graph comparing cycle performance testing results of lithium ion batteries of Example 3 and Comparative Example 3.

Referring to FIG. 10, the two lithium ion batteries of the Example 3 and Comparative Example 3 are galvanostatic cycled using a current rate of 5C at a temperature of about 25° C. The lithium ion battery of the Example 3 has a higher discharge specific capacity at the first cycle (about 55 mAh/g), and a better capacity retention. After 100 Cycles of the charge and discharge, the discharge specific capacity of the lithium ion battery of the Example 3 is hardly decreased.

Example 4

In Example 4, the cathode composite material is prepared using the same method as in Example 3, except that the tetrabutyl titanate is replaced by zirconium n-butoxide, and the cathode composite material is the core-shell structure having $LiMn_2O_4$ as the core and Mn doped $Li_2ZrO_3$ as the shell.

Example 5

Figure 11:
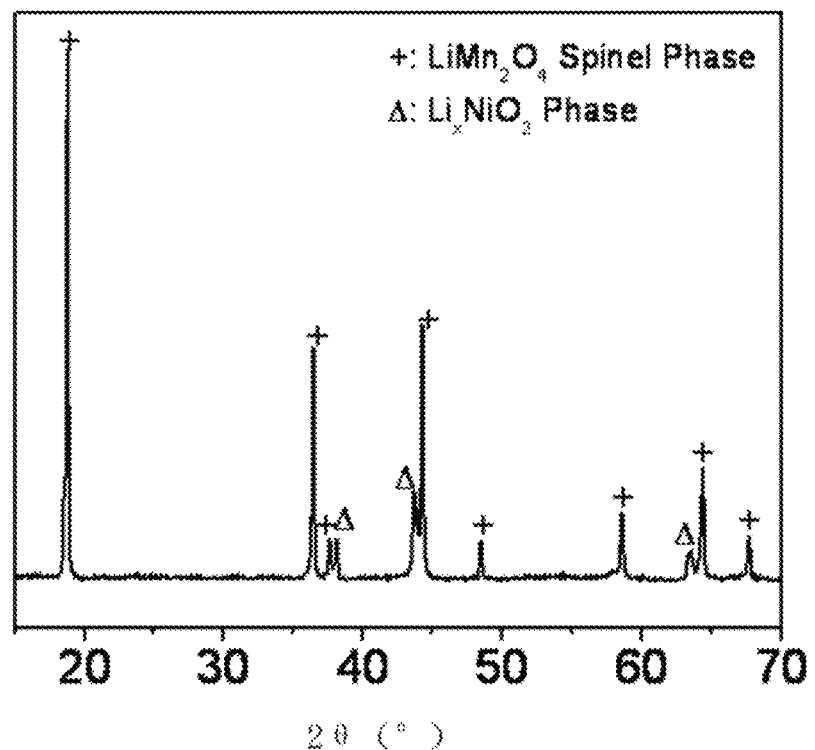
FIG. 11 shows an XRD pattern of Ni doped $Li_2TiO_3$ Coated $LiNi_{0.5}Mn_{1.5}O_4$ of Example 5.

In Example 5, 0.25 g $Ni_{0.5}Mn_{1.5}(OH)_4$ is ultrasonically dispersed in 10 mL of ethanol to achieve the solid-liquid mixture. Then, the tetrabutyl titanate is added into the solid-liquid mixture. A molar percentage of the tetrabutyl titanate to the $Ni_{0.5}Mn_{1.5}(OH)_4$ is about 5%. After adding the tetrabutyl titanate, the solid-liquid mixture is continuously ultrasonically vibrated to uniformly mix the tetrabutyl titanate and the $Ni_{0.5}Mn_{1.5}(OH)_4$ in the ethanol. After that, the solid-liquid mixture is transferred into a dry and clean hydrothermal autoclave and reacted at about 150° C. for about 3 hours. After the hydrothermal synthesis, the amorphous $TiO_2$ layer can be formed on the surface of the $Ni_{0.5}Mn_{1.5}(OH)_4$, to form the composite precursor. The composite precursor and the $LiOH.H_2O$ are mixed in the stoichiometric ratio and are dried to remove the residual ethanol. Then the mixture of the composite precursor and the $LiOH.H_2O$ are heated to about 800° C. at a temperature increasing rate of about 3° C./min, and is heated at the 800° C. for about 5 hours. The cathode composite material is naturally cooled down to room temperature. The cathode composite material is the core-shell structure having $LiNi_{0.5}Mn_{1.5}O_4$ as the core and Ni doped $Li_2TiO_3$ as the shell. An XRD analysis is conducted on the cathode composite material. Referring to FIG. 11, the XRD pattern of the cathode composite material shows that a pure phase $LiNi_{0.5}Mn_{1.5}O_4$ exits in the cathode composite material. The peak of the $Li_2TiO_3$ disappears, which means that Ni ions are doped in the $Li_2TiO_3$. The XPS analysis is conducted on the cathode composite material to measure the content of the element on the surface of the cathode composite material. The XPS analysis result shows that the molar percentage of Ti element is about 11.2%, which is much larger than 5%. That is, Ti element mainly exists on the surface of the cathode composite material. According to a further calculation, Ti element only exists on an outer surface layer having a thickness of about 10 nm of the cathode composite material. The XPS analysis result also shows that the molar percentage of Ni element is about 41%, which is much larger than the Ni element in the $LiNi_{0.5}Mn_{1.5}O_4$ (i.e., about 25%). That is, Ni element dopes the $Li_2TiO_3$ coating layer.

A lithium ion battery is assembled using the cathode composite material of the Example 5 in the cathode electrode.

Comparative Example 5

A lithium ion battery is assembled according to the same conditions as in Example 5, except that the cathode composite material formed in Example 5 is replaced by the bare $LiNi_{0.5}Mn_{1.5}O_4$ without any coating layer coated thereon.

Electrochemical Experiment of Example 5 and Comparative Example 5

Figure 12:
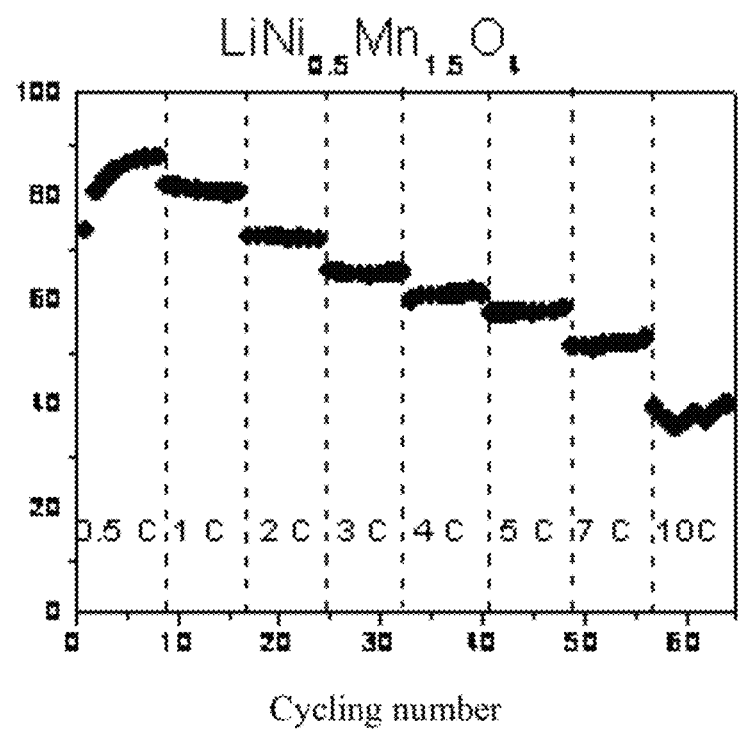
FIG. 12 is a graph showing cycle performance testing results in different current rates of the lithium ion battery of Example 5.
Figure 13:
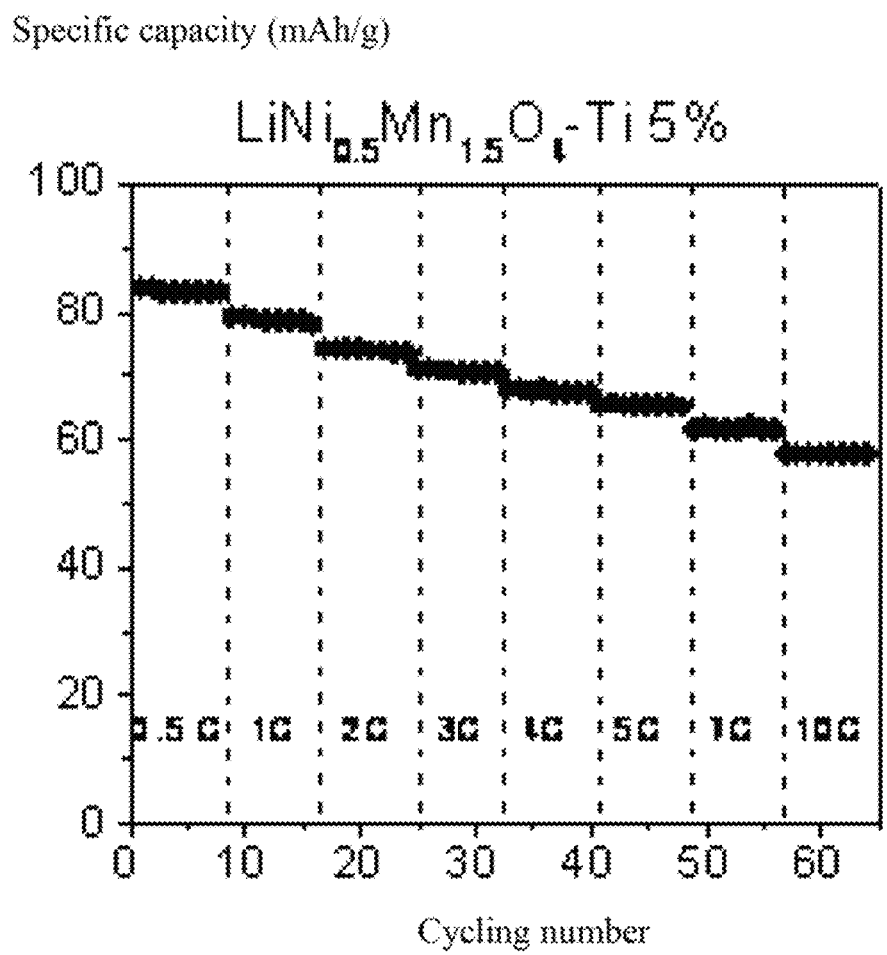
FIG. 13 is a graph showing cycle performance testing results in different current rates of the lithium ion battery of Comparative Example 5.

Referring to FIG. 12 and FIG. 13, the two lithium ion batteries of the Example 5 and Comparative Example 5 are galvanostatic cycled using the current rates of 0.5 C, 1 C, 2 C, 3 C, 4 C, 5 C, 7 C, and 10 C. As shown in FIG. 12, as the current rate increases, the discharge specific capacity of the lithium ion battery of the Comparative Example 5 dramatically decreases. When the current rate gets to 10 C, the discharge capacity of the lithium ion battery of the Comparative Example 5 is only about 40 mAh/g. On the contrary, as shown in FIG. 13, the lithium ion battery in the Example 5 having the $LiNi_{0.5}Mn_{1.5}O_4$ Coated by the Ni doped $Li_2TiO_3$ Coating layer has a much better rating performance. As the current rate increases, the discharge specific capacity of the lithium ion battery of the Example 5 does not decrease much. When the current rate gets to 10 C, the discharge specific capacity of the lithium ion battery of the Example 5 is still about 60 mAh/g.

Example 6

In Example 6, the cathode composite material is prepared using the same method as in Example 5, except that the tetrabutyl titanate is replaced by zirconium n-butoxide, and the cathode composite material is the core-shell structure having $LiNi_{0.5}Mn_{1.5}O_4$ as the core and Ni doped $Li_2ZrO_3$ as the shell.

Example 7

In Example 7, 0.25 g $Co_{0.8}Ni_{0.1}Mn_{0.1}C_2O_4.mH_2O$ is ultrasonically dispersed in 10 mL of ethanol to achieve the solid-liquid mixture. Then, the tetrabutyl titanate is added into the solid-liquid mixture. A molar percentage of the tetrabutyl titanate to the $Co_{0.8}Ni_{0.1}Mn_{0.1}C_2O_4.mH_2O$ is about 5%. After adding the tetrabutyl titanate, the solid-liquid mixture is continuously ultrasonically vibrated to uniformly mix the tetrabutyl titanate and the $Co_{0.8}Ni_{0.1}Mn_{0.1}C_2O_4.mH_2O$ in the ethanol. After that, the solid-liquid mixture is transferred into a dry and clean hydrothermal autoclave and reacted at about 150° C. for about 3 hours. After the hydrothermal synthesis, the amorphous $TiO_2$ layer can be formed on the surface of the $Co_{0.8}Ni_{0.1}Mn_{0.1}C_2O_4.mH_2O$, to form the composite precursor. The composite precursor and the $LiOH.H_2O$ are mixed in the stoichiometric ratio and are dried to remove the residual ethanol. Then the mixture of the composite precursor and the $LiOH.H_2O$ are heated to about 800° C. at a temperature increasing rate of about 3° C./min and is maintained at the 800° C. for about 5 hours. The cathode composite material is naturally cooled down to room temperature. The cathode composite material is the core-shell structure having $LiNi_{0.5}Mn_{1.5}O_4$ as the core and Ni and Co doped $Li_2TiO_3$ as the shell.

A lithium ion battery is assembled using the cathode composite material of the Example 7 in the cathode electrode.

Example 8

In Example 8, the cathode composite material is prepared using the same method as in Example 7, except that the $Co_{0.8}Ni_{0.1}Mn_{0.1}C_2O_4.mH_2O$ is replaced by $Co_{0.6}Ni_{0.2}Mn_{0.2}C_2O_4.mH_2O$, and the cathode composite material is the core-shell structure having $LiCo_{0.6}Ni_{0.2}Mn_{0.2}O_2$ as the core and Ni and Co doped $Li_2TiO_3$ as the shell.

A lithium ion battery is assembled according to the same conditions as in Example 7, except that the cathode composite material in Example 7 is replaced by the cathode composite material in Example 8.

Example 9

In Example 9, the cathode composite material is prepared using the same method as in Example 7, except that the $Co_{0.8}Ni_{0.1}Mn_{0.1}C_2O_4.mH_2O$ is replaced by $Co_{0.4}Ni_{0.3}Mn_{0.3}C_2O_4.mH_2O$, and the cathode composite material is the core-shell structure having $LiCo_{0.4}Ni_{0.3}Mn_{0.3}O_2$ as the core and Ni and Co doped $Li_2TiO_3$ as the shell.

A lithium ion battery is assembled according to the same conditions as in Example 7, except that the cathode composite material in Example 7 is replaced by the cathode composite material in Example 9.

Figure 14:
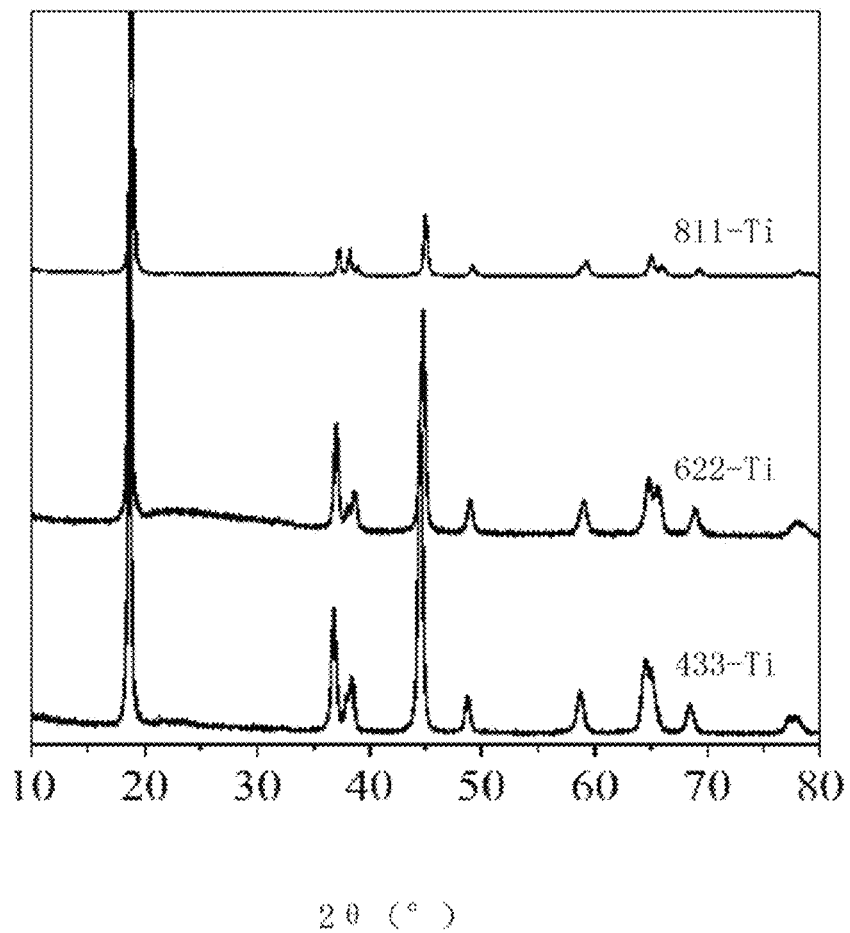
FIG. 14 shows XRD patterns of Co and Ni doped $Li_2TiO_3$ Coated $Li(Co_{0.8}Ni_{0.1}Mn_{0.1})O_2$, $Li(Co_{0.6}Ni_{0.2}Mn_{0.2})O_2$, and $LiCo_{0.4}Ni_{0.3}Mn_{0.3}O_2$ of Examples 7 to 9.

The XRD analyses are conducted on the cathode composite materials of Examples 7 to 9. Referring to FIG. 14, the XRD patterns of the cathode composite materials of Example 7 to 9 show that pure phase $LiCo_{0.8}Ni_{0.1}Mn_{0.1}O_2$ (labeled as "811-Ti"), $LiCo_{0.6}Ni_{0.2}Mn_{0.2}O_2$ (labeled as "622-Ti"), and $LiCo_{0.4}Ni_{0.3}Mn_{0.3}O_2$ (labeled as "433-Ti") are respectively formed. The peak of the $Li_2TiO_3$ disappears, which means that Co ions and Ni ions are doped in the $Li_2TiO_3$. The XPS analysis is conducted on the cathode composite material of Example 9 to measure the content of the element on the surface of the cathode composite material. The XPS analysis result shows that the molar percentage of Ti element is about 23.3%, which is much larger than 5%. That is, Ti element mainly exists on the surface of the cathode composite material. According to a further calculation, Ti element only exists on an outer surface layer having a thickness of about 10 nm of the cathode composite material. The XPS analysis result also shows that the molar percentage of Ni element is about 31.5%, which is much larger than the Ni element in the $LiCo_{0.4}Ni_{0.3}Mn_{0.3}O_2$ (i.e., about 31.5%). The XPS analysis result also shows that the molar percentage of Co element is about 46%, which is much larger than the Co element in the $LiCo_{0.4}Ni_{0.3}Mn_{0.3}O_2$ (i.e., about 40%). That is, Co and Ni element both dope the $Li_2TiO_3$ Coating layer.

Comparative Examples 7 to 9

Lithium ion batteries are assembled according to the same conditions as in Examples 7 to 9, except that the cathode composite material formed in Examples 7 to 9 are respectively replaced by the bare $LiCo_{0.8}Ni_{0.1}Mn_{0.1}O_2$, $LiCo_{0.6}Ni_{0.2}Mn_{0.2}O_2$ and $LiCo_{0.4}Ni_{0.3}Mn_{0.3}O_2$ without any coating layer coated thereon.

Electrochemical Experiment of Examples 7 to 9 and Comparative Examples 7 to 9

Figure 15:
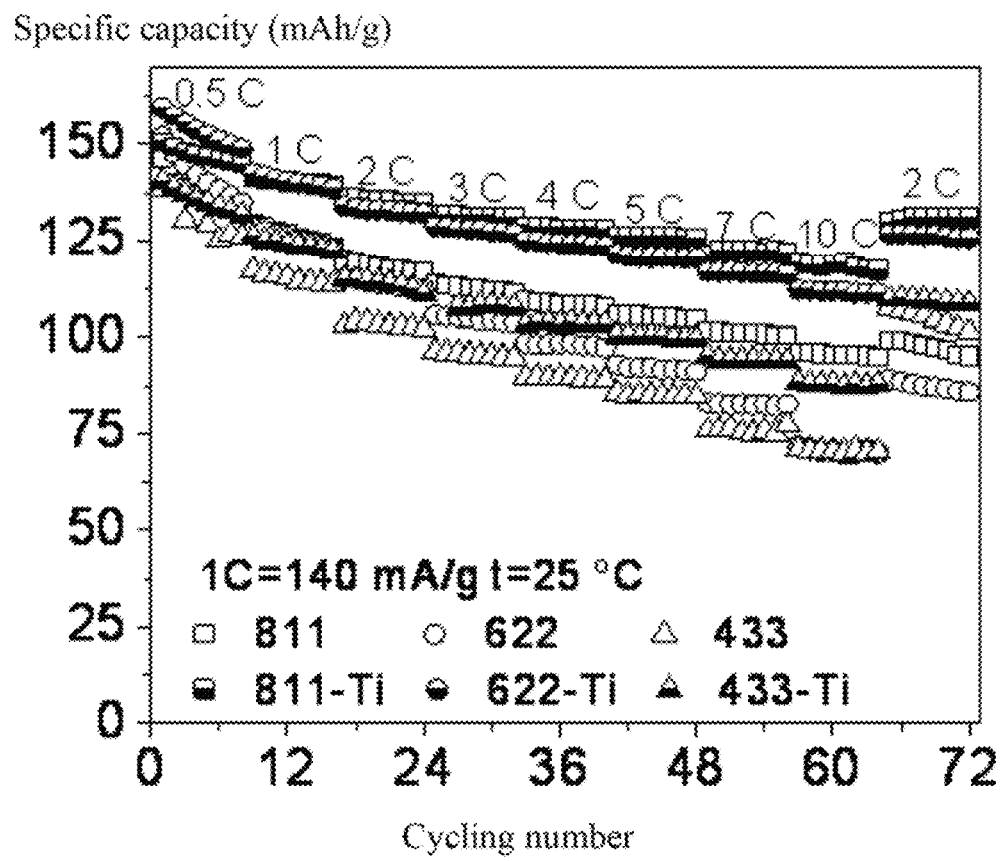
FIG. 15 is a graph comparing cycle performance testing results of lithium ion batteries of Examples 7 to 9 and corresponded Comparative Examples 7 to 9.

Referring to FIG. 15, the six lithium ion batteries of the Examples 7 to 9 and Comparative Examples 7 to 9 are galvanostaticly cycled using the current rates of 0.5C, 1C, 2C, 3C, 4C, 5C, 7C, and 10C. As the current rate increases, the discharge specific capacities of the lithium ion batteries of the Comparative Examples 7 to 9 using bare $LiCo_{0.8}Ni_{0.1}Mn_{0.1}O_2$ (labeled as "811"), $LiCo_{0.6}Ni_{0.2}Mn_{0.2}O_2$ (labeled as "622"), and $LiCo_{0.4}Ni_{0.3}Mn_{0.3}O_2$ (labeled as "433") dramatically decreases. When the current rate gets to 10C, the discharge capacity of the lithium ion battery using the bare $LiCo_{0.6}Ni_{0.2}Mn_{0.2}O_2$ is only about 75 mAh/g. On the contrary, the lithium ion batteries in the Examples 7 to 9 having the $LiCo_{0.8}Ni_{0.1}Mn_{0.1}O_2$ (labeled as "811-Ti"), $LiCo_{0.6}Ni_{0.2}Mn_{0.2}O_2$ (labeled as "622-Ti"), and $LiCo_{0.4}Ni_{0.3}Mn_{0.3}O_2$ (labeled as "433-Ti") coated by the Co and Ni doped Li2TiO3 Coating layers have much better rating performances. As the current rate increases, the discharge specific capacities of the lithium ion batteries of the Examples 7 to 9 do not decrease much. When the current rate gets to 10C, the discharge specific capacity of the lithium ion battery using the $LiCo_{0.6}Ni_{0.2}Mn_{0.2}O_2$ Coated by the Co and Ni doped $Li_2TiO_3$ Coating layer is still about 125 mAh/g.

Figure 16:
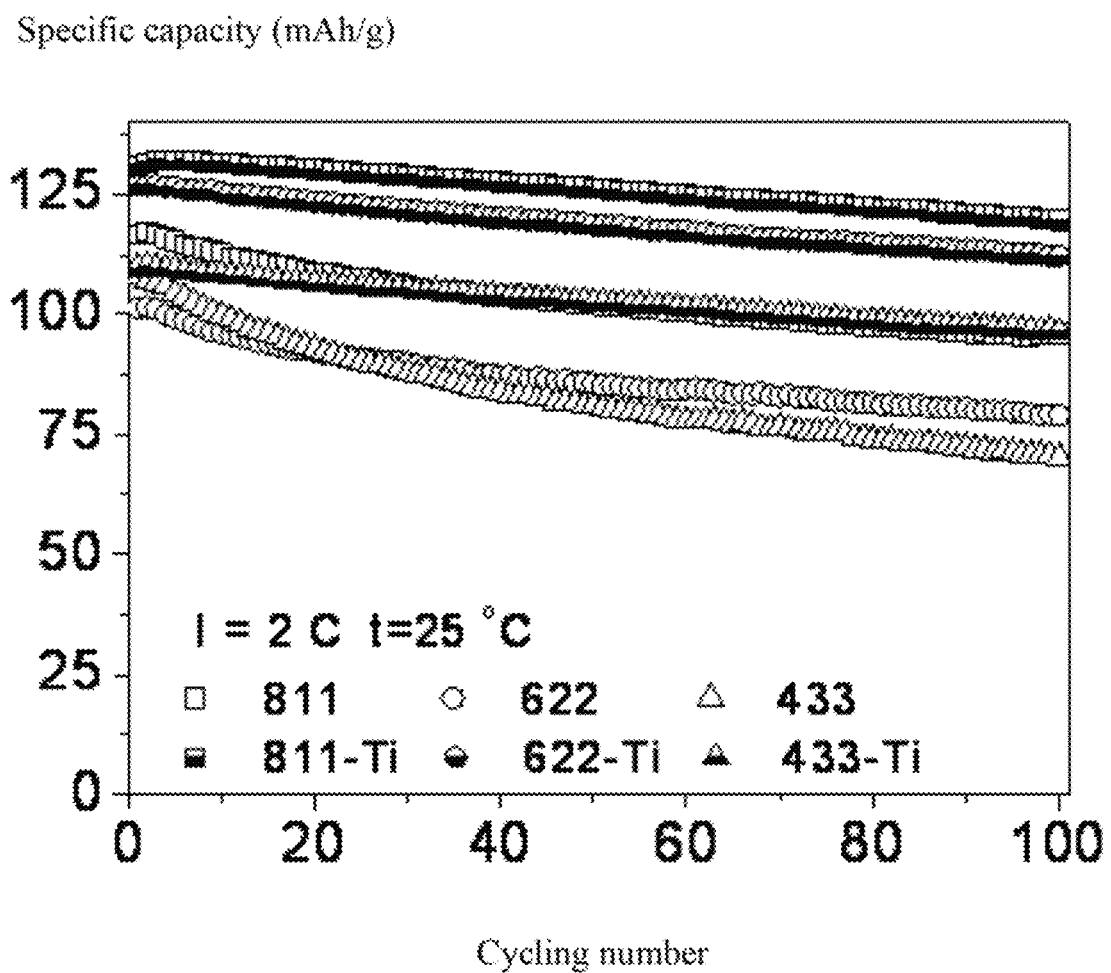
FIG. 16 is a graph comparing cycle performance testing results in different current rates of lithium ion batteries of Examples 7 to 9 and corresponded Comparative Examples 7 to 9.

Referring to FIG. 16, the six lithium ion batteries of the Examples 7 to 9 and Comparative Examples 7 to 9 are galvanostaticly cycled using a current rate of 2C at a temperature of about 25° C. The lithium ion batteries of the Examples 7 to 9 have higher discharge specific capacities at the first cycle (about 131 mAh/g for Example 7, about 126 mAh/g for Example 8, and about 110 mAh/g for Example 9), and better capacity retentions. After 100 Cycles of the charge and discharge, the discharge specific capacities of the lithium ion batteries of the Examples 7 to 9 are hardly decreased. On the contrary, the lithium ion batteries of the Comparative Examples 7 to 9 have lower discharge specific capacities at the first cycle (about 117 mAh/g for Comparative Example 7, about 100 mAh/g for Comparative Example 8, and about 108 mAh/g for Comparative Example 9). After 100 Cycles of the charge and discharge, the discharge specific capacities of the lithium ion batteries are only about 98 mAh/g, 80 mAh/g, and 69 mAh/g respectively.

Example 10

In Example 10, the cathode composite material is prepared using the same method as in Example 7, except that the tetrabutyl titanate is replaced by zirconium n-butoxide, and the cathode composite material is the core-shell structure having $LiCo_{0.8}Ni_{0.1}Mn_{0.1}O_2$ as the core and Co and Ni doped $Li_2ZrO_3$ as the shell.

Example 11

In Example 11, the cathode composite material is prepared using the same method as in Example 1, except that the $Co(OH)_2$ is replaced by $Co_{0.75}Ni_{0.25}(OH)_2$, and the cathode composite material is the core-shell structure having $LiCo_{0.75}Ni_{0.25}O_2$ as the core and Co and Ni doped $Li_2TiO_3$ as the shell.

Figure 17:
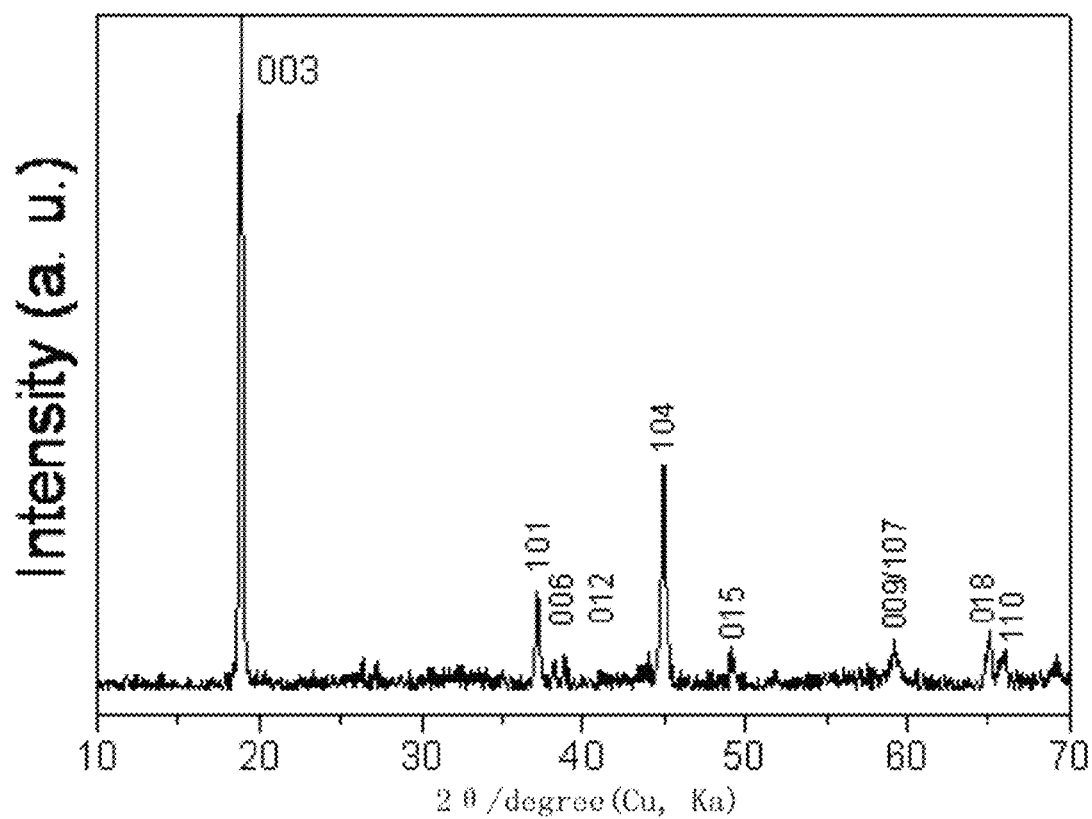
FIG. 17 shows an XRD pattern of Co doped $Li_2TiO_3$ Coated $LiCo_{0.75}Ni_{0.25}O_2$ of Example 11.

Referring to FIG. 17, an XRD analysis is conducted on the cathode composite material of Example 11. The XRD pattern of the cathode composite material shows that a pure phase $LiCo_{0.75}Ni_{0.25}O_2$ exits in the cathode composite material. The peak of the $Li_2TiO_3$ disappears, which means that Co ions and Ni ions are doped in the $Li_2TiO_3$.

A lithium ion battery is assembled using the cathode composite material of the Example 11 in the cathode electrode.

Electrochemical Experiment of Example 11

Figure 18:
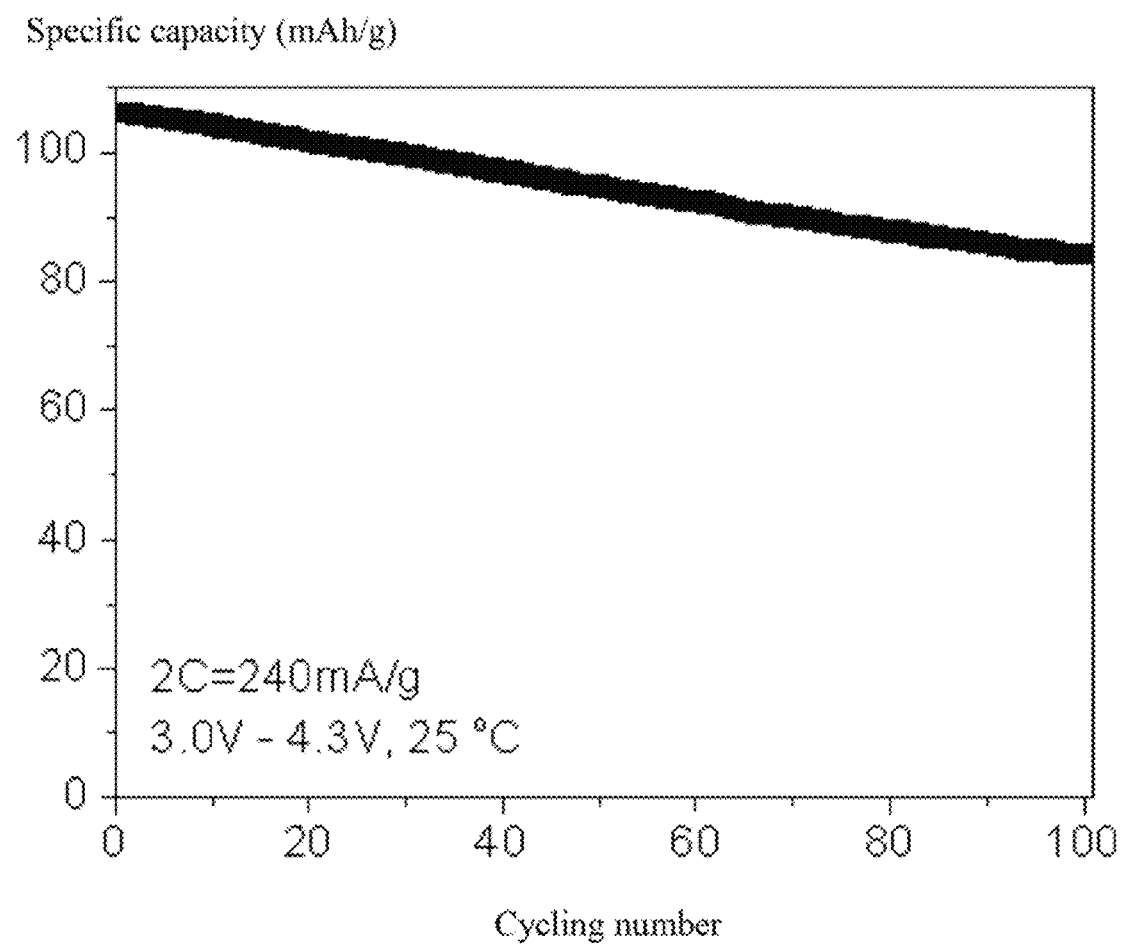
FIG. 18 is a graph showing a cycle performance testing result of the lithium ion battery of Example 11.

Referring to FIG. 18, the lithium ion battery of Example 11 is galvanostaticly cycled using the 2C current rate at room temperature. The lithium ion battery of the Example 11 has a high discharge specific capacity at the first cycle (about 108 mAh/g), and a good capacity retention after 100 Cycles of the charge and discharge.

Figure 19:
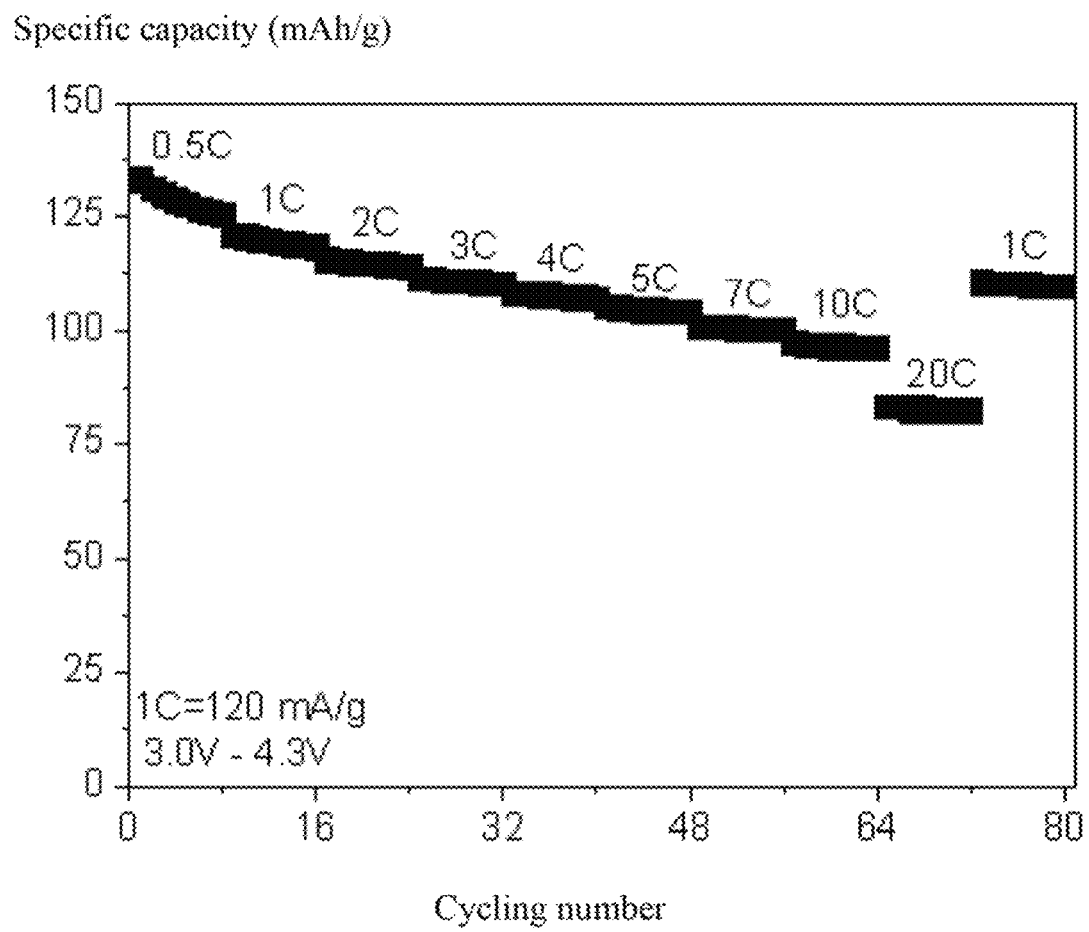
FIG. 19 is a graph showing cycle performance testing results in different current rates of the lithium ion battery of Example 11.

Referring to FIG. 19, the lithium ion battery of the Example 11 is galvanostaticly cycled using the current rates of 0.5 C, 1 C, 2 C, 3 C, 4 C, 5 C, 7 C, 10 C, and 20 C. As the current rate increases, the discharge specific capacity of the lithium ion battery of the Example 11 does not decrease much.

Example 12

In Example 12, the cathode composite material is prepared using the same method as in Example 11, except that the tetrabutyl titanate is replaced by zirconium n-butoxide, and the cathode composite material is the core-shell structure having $LiCo_{0.75}Ni_{0.25}O_2$ as the core and Co and Ni doped $Li_2ZrO_3$ as the shell.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A cathode composite material comprising: a cathode active material and a coating layer coated on a surface of the cathode active material, the coating layer comprises a lithium metal oxide having a crystal structure that belongs to C2/c space group of the monoclinic crystal system, wherein a general formula of the lithium metal oxide is $[Li_{1-2a}M_a\square_a][Li_{1/3-2b-c}M_bN_{3c}A_{2/3-2c}\square_b]O_2$, wherein A represents a metal element having a +4 valence, M and N respectively represent doping chemical elements, "$\square$" represents an atom vacancy occupying a Li site of $[Li][Li_{1/3}A_{2/3}]O_2$, $0 \leq 2a < 1$, $0 \leq 2b+c < 1/3$, and $0 \leq 2c < 2/3$.

2. The cathode composite material of claim 1, wherein A is selected from the group consisting of Ti, Sn, Mn, Pb, Te, Ru, Hf, Zr, and any combination thereof.

3. The cathode composite material of claim 1, wherein the M and N are respectively selected from the group consisting of alkali metal elements, alkaline-earth metal elements, Group-13 elements, Group-14 elements, transition metal elements, rare-earth elements, and any combination thereof.

4. The cathode composite material of claim 3, wherein M and N are respectively selected from the group consisting of Co, Mn, Ni, Cr, V, Ti, Sn, Cu, Al, Fe, B, Sr, Ca, Ga, Nd, Mg, and combinations thereof.

5. The cathode composite material of claim 1, wherein at least one of M and N comes from the cathode active material.

6. The cathode composite material of claim 1, wherein the coating layer is a continuous layer and has a uniform thickness.

7. The cathode composite material of claim 1, wherein the coating layer is an in situ formed layer on the surface of the cathode active material.

8. The cathode composite material of claim 1, wherein a mass percentage of the coating layer is in a range from about 0.05% to about 7%.

9. The cathode composite material of claim 1, wherein a thickness of the coating layer is in a range from about 2 nanometers to about 20 nanometers.

10. The cathode composite material of claim 1, wherein the cathode active material comprises a plurality of cathode active material particles, the coating layer is individually coated on the surface of each of the plurality of cathode active material particles.

11. The cathode composite material of claim 10, wherein the coating layer completely coats an entire outer surface of the each of the plurality of cathode active material particles.

12. The cathode composite material of claim 1, wherein a size of the cathode active material is in a range from about 1 micron to about 500 microns.

13. The cathode composite material of claim 1, wherein a shape of cathode active material is selected from the group consisting of sphere shape, rod shape, needle shape, sheet shape, tube shape, and irregular shape.

14. The cathode composite material of claim 13, wherein the cathode composite material has a shape corresponding to the shape of the cathode active material.

15. The cathode composite material of claim 1, wherein the cathode active material and the coating layer are combined by a chemical bonding force therebetween.

16. The cathode composite material of claim 1, wherein the material of the coating layer is selected from the group consisting of $Li_2TiO_3$, $Li_2MnO_3$, $Li_2SnO_3$, $Li_2PbO_3$, $Li_2TeO_3$, $Li_2RuO_3$, $Li_2HfO_3$, $Li_2ZrO_3$, and combinations thereof.

17. A lithium ion battery comprising:
an anode electrode;
a cathode electrode comprising a cathode composite material comprising a plurality of cathode active material particles and a coating layer coated on a surface of each of the plurality of cathode active material particles, and the coating layer comprises a lithium metal oxide having a crystal structure belonging to C2/c space group of the monoclinic crystal system; and
a non-aqueous electrolyte disposed between the cathode electrode and the anode electrode, wherein a general formula of the lithium metal oxide is $[Li_{1-2a}M_a\square_a][Li_{1/3-2b-c}M_bN_{3c}A_{2/3-2c}\square_b]O_2$, wherein A represents a metal element having a +4 valence, M and N respectively represent doping chemical elements, "$\square$" represents an atom vacancy occupying a Li site of $[Li][Li_{1/3}A_{2/3}]O_2$, $0 \leq 2a < 1$, $0 \leq 2b+c < 1/3$, and $0 \leq 2c < 2/3$.

* * * * *